(12) United States Patent
Kamada et al.

(10) Patent No.: US 10,352,397 B2
(45) Date of Patent: Jul. 16, 2019

(54) BICYCLE CHAIN

(71) Applicant: SHIMANO INC., Sakai (JP)

(72) Inventors: Kenji Kamada, Sakai (JP); Koji Yuasa, Sakai (JP)

(73) Assignee: SHIMANO INC., Sakai (JP)

( * ) Notice: Subject to any disclaimer, the term of this patent is extended or adjusted under 35 U.S.C. 154(b) by 142 days.

(21) Appl. No.: 15/447,015

(22) Filed: Mar. 1, 2017

(65) Prior Publication Data

US 2018/0252294 A1  Sep. 6, 2018

(51) Int. Cl.
| | |
|---|---|
| B62M 9/00 | (2006.01) |
| B62M 9/10 | (2006.01) |
| B62M 9/12 | (2006.01) |
| F16G 13/06 | (2006.01) |
| F16H 55/30 | (2006.01) |

(52) U.S. Cl.
CPC .............. *F16G 13/06* (2013.01); *B62M 9/10* (2013.01); *B62M 9/12* (2013.01); *F16H 55/30* (2013.01); *B62M 2009/005* (2013.01)

(58) Field of Classification Search
CPC ... F16G 13/06; B62M 2009/005; B62M 9/00; B62M 9/06; B62M 9/10
USPC ........................................................ 474/226
See application file for complete search history.

(56) References Cited

U.S. PATENT DOCUMENTS

| | | | | |
|---|---|---|---|---|
| 3,421,313 A | * | 1/1969 | Kai .......................... | F16G 13/06 474/226 |
| 4,102,216 A | * | 7/1978 | Nagano ................... | F16G 13/02 474/231 |
| 4,265,134 A | * | 5/1981 | Dupoyet ................. | F16G 13/06 474/231 |
| 4,642,078 A | * | 2/1987 | Dupoyet ................. | F16G 13/06 474/206 |
| 5,098,349 A | * | 3/1992 | Wu ......................... | F16G 13/06 474/206 |
| 5,140,806 A | * | 8/1992 | Rohloff .................... | F16G 13/06 474/228 |
| 5,226,857 A | * | 7/1993 | Ono ........................ | F16G 13/06 474/231 |
| 5,322,482 A | * | 6/1994 | Wang ....................... | F16G 13/06 474/206 |
| 5,346,006 A | * | 9/1994 | Wu ......................... | F16G 13/06 474/206 |

(Continued)

FOREIGN PATENT DOCUMENTS

JP  54-15239  2/1979

*Primary Examiner* — Henry Y Liu
(74) *Attorney, Agent, or Firm* — Mori & Ward, LLP

(57) ABSTRACT

A bicycle chain comprises a first inner link plate comprising a first end portion, a second end portion, and a first intermediate portion. A second inner link plate is spaced apart from the first inner link plate in an axial direction. The second inner link plate comprises a third end portion, a fourth end portion, and a second intermediate portion. The first inner link plate includes a first outer surface and a first inner surface opposite to the first outer surface in the axial direction. The second inner link plate includes a second outer surface and a second inner surface opposite to the second outer surface in the axial direction. The first intermediate portion has an axial recess formed on the first inner surface in the axial direction. The second intermediate portion is free from an axial recess formed on the second inner surface in the axial direction.

17 Claims, 16 Drawing Sheets

(56) References Cited

U.S. PATENT DOCUMENTS

| | | | | |
|---|---|---|---|---|
| 5,741,196 | A * | 4/1998 | Campagnolo | B62M 9/10 |
| | | | | 474/206 |
| 6,110,064 | A * | 8/2000 | Guichard | F16G 13/06 |
| | | | | 474/230 |
| 6,662,544 | B1 * | 12/2003 | Wu | F16G 13/06 |
| | | | | 474/206 |
| 7,267,220 | B2 * | 9/2007 | Wang | F16G 13/06 |
| | | | | 198/850 |
| 7,325,391 | B1 * | 2/2008 | Oishi | F16G 13/06 |
| | | | | 59/5 |
| 8,066,604 | B2 * | 11/2011 | Righi | F16G 13/06 |
| | | | | 474/206 |
| 8,734,280 | B2 * | 5/2014 | Oishi | F16G 13/06 |
| | | | | 474/230 |
| 9,255,624 | B2 * | 2/2016 | Fukumori | F16G 13/06 |
| 9,303,725 | B2 * | 4/2016 | Fukumori | B62M 9/00 |
| 2006/0014600 | A1 * | 1/2006 | Wu | F16G 13/06 |
| | | | | 474/206 |
| 2012/0322599 | A1 * | 12/2012 | Oishi | F16G 13/06 |
| | | | | 474/230 |
| 2015/0308542 | A1 * | 10/2015 | Fukumori | B62M 9/00 |
| | | | | 474/230 |
| 2017/0067535 | A1 * | 3/2017 | Fukumori | F16G 13/06 |
| 2018/0017131 | A1 * | 1/2018 | Fukumori | F16G 13/06 |

* cited by examiner

BICYCLE CHAIN

BACKGROUND OF THE INVENTION

Field of the Invention

The present invention relates to a bicycle chain.

Discussion of the Background

Bicycling is becoming an increasingly more popular form of recreation as well as a means of transportation. Moreover, bicycling has become a very popular competitive sport for both amateurs and professionals. Whether the bicycle is used for recreation, transportation or competition, the bicycle industry is constantly improving the various components of the bicycle. One component that has been recently redesigned is the bicycle chain.

SUMMARY OF THE INVENTION

In accordance with a first aspect of the present invention, a bicycle chain comprises a first inner link plate and a second inner link plate. The first inner link plate comprises a first end portion, a second end portion, and a first intermediate portion. The first end portion includes a first opening having a first center axis. The second end portion includes a second opening having a second center axis. The first intermediate portion interconnects the first end portion and the second end portion. The second inner link plate is spaced apart from the first inner link plate in an axial direction parallel to one of the first center axis and the second center axis in an assembled state where the bicycle chain is assembled. The second inner link plate comprises a third end portion, a fourth end portion, and a second intermediate portion. The third end portion includes a third opening having a third center axis. The fourth end portion includes a fourth opening having a fourth center axis. The second intermediate portion interconnects the third end portion and the fourth end portion. The first inner link plate includes a first outer surface and a first inner surface opposite to the first outer surface in the axial direction. The second inner link plate includes a second outer surface and a second inner surface opposite to the second outer surface in the axial direction. The first inner surface and the second inner surface are configured to face each other in the assembled state. The first intermediate portion of the first inner link plate has an axial recess formed on the first inner surface in the axial direction. The second intermediate portion of the second inner link plate is free from an axial recess formed on the second inner surface of the second intermediate portion in the axial direction.

With the bicycle chain according to the first aspect, it is possible for the bicycle chain to hold bicycle sprocket teeth more tightly than a conventional bicycle chain.

In accordance with a second aspect of the present invention, the bicycle chain comprises a first inner link plate, a second inner link plate, a first outer link plate, and a second outer link plate. The first inner link plate comprises a first end portion, a second end portion, and a first intermediate portion. The first end portion includes a first opening having a first center axis. The second end portion includes a second opening having a second center axis. The first intermediate portion interconnects the first end portion and the second end portion. The second inner link plate is spaced apart from the first inner link plate in an axial direction parallel to one of the first center axis and the second center axis to provide an inner link space between the first inner link plate and the second inner link plate in an assembled state where the bicycle chain is assembled. The inner link space is configured to receive a sprocket tooth of a bicycle sprocket and has a longitudinal inner link space center line. The second inner link plate comprises a third end portion, a fourth end portion, and a second intermediate portion. The third end portion includes a third opening having a third center axis. The fourth end portion includes a fourth opening having a fourth center axis. The second intermediate portion interconnects the third end portion and the fourth end portion. The first outer link plate comprises a fifth end portion, a sixth end portion, and a third intermediate portion. The fifth end portion includes a fifth opening having a fifth center axis. The sixth end portion includes a sixth opening having a sixth center axis. The third intermediate portion interconnects the fifth end portion and the sixth end portion. The second outer link plate is spaced apart from the first outer link plate in the axial direction to form an outer link space between the first outer link plate and the second outer link plate in the assembled state. The outer link space is configured to receive a sprocket tooth of the bicycle sprocket and has a longitudinal outer link space center line that is offset from the longitudinal inner link space center line in the axial direction.

With the bicycle chain according to the second aspect, it is possible for the bicycle chain to hold bicycle sprocket teeth more tightly than a conventional bicycle chain.

In accordance with a third aspect of the present invention, the bicycle chain according to any one of the first and second aspects is configured so that the second intermediate portion has an edge and includes a chamfer formed on the edge.

With the bicycle chain according to the third aspect, it is possible to engage sprocket teeth and the bicycle chain smoothly.

In accordance with a fourth aspect of the present invention, the bicycle chain according to the third aspect is configured so that the chamfer is configured to facilitate a shifting operation.

With the bicycle chain according to the fourth aspect, it is possible for the bicycle chain to change engagement with the bicycle sprockets smoothly.

In accordance with a fifth aspect of the present invention, the bicycle chain according to any one of the first to fourth aspects is configured so that the first inner link plate has a longitudinal center axis as viewed from the axial direction. The axial recess at least partly overlaps with the longitudinal center axis as viewed from the axial direction.

With the bicycle chain according to the fifth aspect, it is possible for the bicycle chain to hold bicycle sprocket teeth further more tightly than a conventional bicycle chain.

In accordance with a sixth aspect of the present invention, the bicycle chain according to the fifth aspect is configured so that the first intermediate portion has a first edge and a second edge opposite to the first edge in a transverse direction perpendicular to the longitudinal center axis. The axial recess extends from the first edge to the second edge.

With the bicycle chain according to the sixth aspect, it is possible for the bicycle chain to hold bicycle sprocket teeth further more tightly than a conventional bicycle chain.

In accordance with a seventh aspect of the present invention, the bicycle chain according to any one of the first to sixth aspects is configured so that the axial recess is formed by bending the first inner link plate at the first intermediate portion.

With the bicycle chain according to the seventh aspect, it is possible to manufacture the bicycle chain easily.

In accordance with an eighth aspect of the present invention, the bicycle chain according to any one of the first to seventh aspects is configured so that the first inner link plate is disposed far from a bicycle center plane of a bicycle than the second inner link plate in a state where the bicycle chain is mounted to the bicycle.

With the bicycle chain according to the eighth aspect, it is possible to facilitate a shifting operation of the bicycle rear sprockets as well as it is possible for the bicycle chain to hold bicycle sprocket teeth tightly.

In accordance with a ninth aspect of the present invention, the bicycle chain according to any one of the first to eighth aspects is configured so that the first inner link plate is disposed closer to a bicycle center plane of a bicycle than the second inner link plate in a state where the bicycle chain is mounted to the bicycle.

With the bicycle chain according to the ninth aspect, it is possible to facilitate a shifting operation of the bicycle front sprockets as well as it is possible for the bicycle chain to hold bicycle sprocket teeth tightly.

In accordance with a tenth aspect of the present invention, the bicycle chain according to any one of the first to ninth aspects is configured so that the first inner link plate and the second inner link plate form an inner link space therebetween. The inner link space is configured to receive a sprocket tooth of a bicycle sprocket and has a first maximum transverse width ranging from 2.1 mm to 3.6 mm.

With the bicycle chain according to the tenth aspect, it is possible for the bicycle chain to hold bicycle sprocket teeth further more tightly than a conventional bicycle chain.

In accordance with an eleventh aspect of the present invention, the bicycle chain according to any one of the first to tenth aspects further comprises a first outer link plate and a second outer link plate opposite to the first outer link plate in the axial direction. The first outer link plate and the second outer link plate form an outer link space therebetween. The outer link space is configured to receive a sprocket tooth of a bicycle sprocket and has a second maximum transverse width equal to or less than 4.1 mm.

With the bicycle chain according to the eleventh aspect, it is possible for the bicycle chain to hold bicycle sprocket teeth further more tightly than a conventional bicycle chain.

In accordance with a twelfth aspect of the present invention, the bicycle chain according to any one of the first to eleventh aspects is configured so that the first inner link plate and the second inner link plate form an inner link space therebetween. The inner link space has a first maximum transverse width and is configured to receive a sprocket tooth of a bicycle sprocket. The bicycle chain further comprises a first outer link plate and a second outer link plate opposite to the first outer link plate in the axial direction. The first outer link plate and the second outer link plate form an outer link space therebetween. The outer link space has a second maximum transverse width and is configured to receive a sprocket tooth of the bicycle sprocket. The first maximum transverse width divided by the second maximum transverse width is equal to or larger than 0.6.

With the bicycle chain according to the twelfth aspect, it is possible for the bicycle chain to hold bicycle sprocket teeth further more tightly than a conventional bicycle chain.

In accordance with a thirteenth aspect of the present invention, a drive train comprises the bicycle chain according to any one of the first to twelfth aspects and at least one bicycle rear sprocket. The at least one bicycle rear sprocket includes a first sprocket tooth to be received in an inner link space formed between the first inner link plate and the second inner link plate.

With the drive train according to the thirteenth aspect, it is possible to provide a drive train having a bicycle rear sprocket and a bicycle chain to hold sprocket teeth of the bicycle rear sprocket more tightly than a conventional bicycle chain.

In accordance with a fourteenth aspect of the present invention, the drive train according to the thirteenth aspect is configured so that the bicycle chain further comprises a first outer link plate and a second outer link plate opposite to the first outer link plate in the axial direction. The at least one bicycle rear sprocket further includes a second sprocket tooth to be received in an outer link space formed between the first outer link plate and the second outer link plate. The first sprocket tooth has a first chain engaging width. The second sprocket tooth has a second chain engaging width that is larger than the first chain engaging width in the axial direction.

With the drive train according to the fourteenth aspect, the bicycle chain is configured to hold sprocket teeth of the bicycle sprocket further more tightly, because both the first sprocket teeth and the second sprocket teeth engage with the bicycle chain.

In accordance with a fifteenth aspect of the present invention, a drive train comprises the bicycle chain according to any one of the first to twelfth aspects and a bicycle front sprocket. The bicycle front sprocket includes a third sprocket tooth to be received in an inner link space formed between the first inner link plate and the second inner link plate.

With the drive train according to the fifteenth aspect, it is possible to provide a drive train having a bicycle front sprocket and a bicycle chain to hold sprocket teeth of the bicycle front sprocket more tightly than a conventional bicycle chain.

In accordance with a sixteenth aspect of the present invention, the drive train according to the fifteenth aspect is configured so that the bicycle chain comprises a first outer link plate and a second outer link plate opposite to the first outer link plate in the axial direction. The bicycle front sprocket further includes a fourth sprocket tooth to be received in an outer link space formed between the first outer link plate and the second outer link plate. The third sprocket tooth has a third chain engaging width. The fourth sprocket tooth has a fourth chain engaging width that is larger than the third chain engaging width in the axial direction.

With the drive train according to the sixteenth aspect, the bicycle chain is configured to hold sprocket teeth of the bicycle sprocket further more tightly, because both the third sprocket teeth and the fourth sprocket teeth engage with the bicycle chain.

In accordance with a seventeenth aspect of the present invention, the drive train according to any one of the fifteenth and sixteenth aspects is configured so that the bicycle front sprocket is a singular front sprocket.

With the drive train according to the seventeenth aspect, it is possible to provide a drive train having a bicycle front sprocket and a bicycle chain to hold sprocket teeth of the bicycle front sprocket more tightly than a conventional bicycle chain.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

Figure 1:
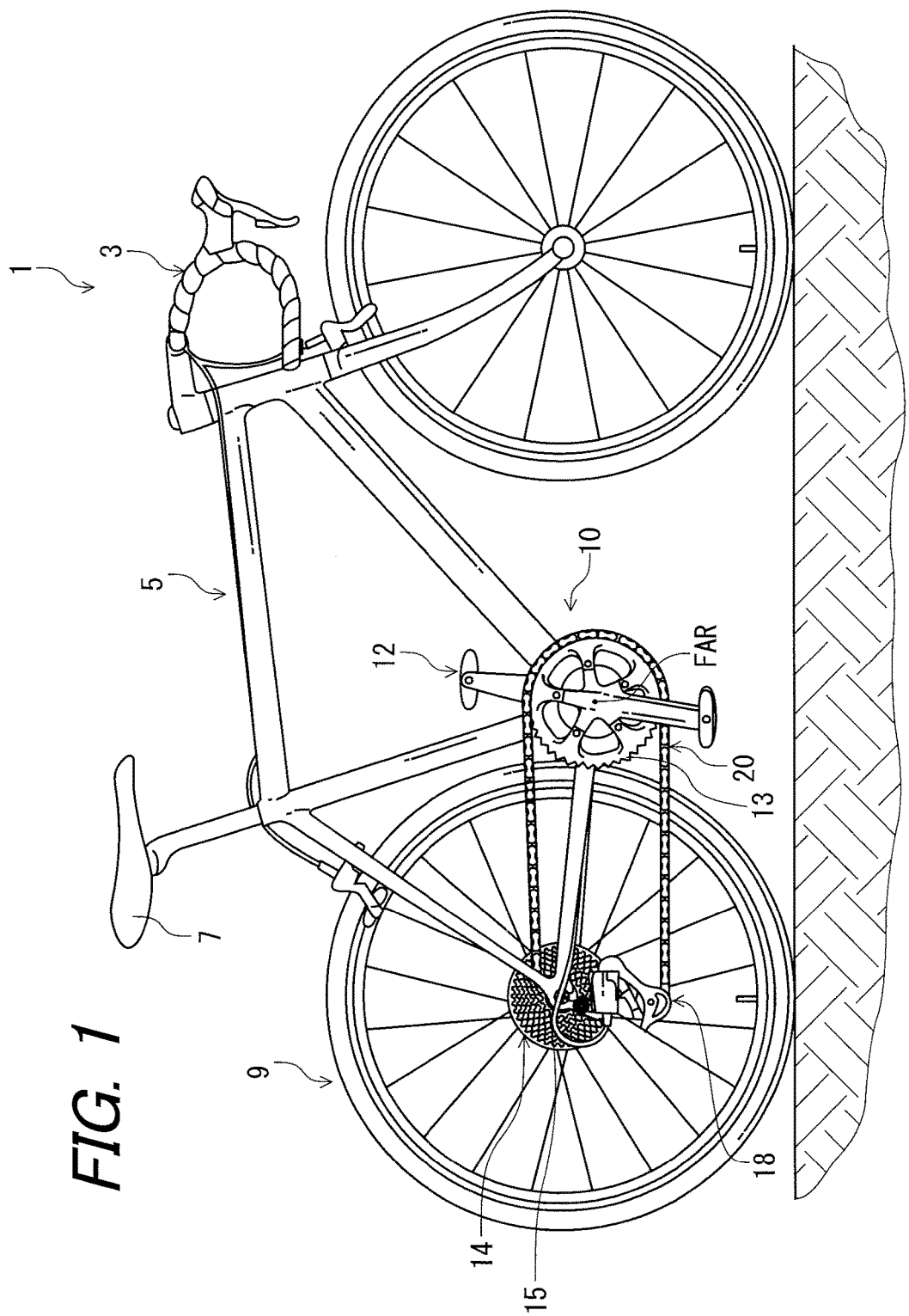
FIG. 1 is a side elevational view of a bicycle having a drive train that uses a bicycle chain in accordance with one embodiment of the present invention.

The embodiments will now be described with reference to the accompanying drawings, wherein like reference numerals designate corresponding or identical elements throughout the various drawings.

Referring initially to FIG. 1, a bicycle 1 is illustrated to be equipped with a bicycle chain 20 in accordance with one embodiment of the present invention. The bicycle 1 includes, among other things, a handlebar 3, a bicycle frame 5, a saddle 7, and a drive train 10. The drive train 10 is configured to convert the rider's pedaling force into driving force. The drive train 10 includes the bicycle chain 20. The drive train 10 also includes a front crank set 12, a bicycle rear sprocket assembly 14, and a bicycle rear derailleur 18. The front crank set 12 is rotatably mounted on a bottom bracket of the bicycle frame 5. The front crank set 12 includes a bicycle front sprocket 13 to engage with the bicycle chain 20. Accordingly, the drive train 10 comprises the bicycle chain 20 and the bicycle front sprocket 13. Preferably, the bicycle front sprocket is a singular front sprocket. The bicycle rear sprocket assembly 14 is mounted to a rear axle of a rear wheel 9. The bicycle rear sprocket assembly 14 includes at least one bicycle rear sprocket 15 to engage with the bicycle chain 20. Accordingly, the drive train 10 comprises the bicycle chain 20 and at least one bicycle rear sprocket 15. The bicycle chain 20 is arranged on the front crank set 12 and the bicycle rear sprocket assembly 14 so as to extend therebetween. The bicycle rear derailleur 18 are configured and arranged to change gears by shifting the bicycle chain 20 in a transverse direction of the bicycle 1.

In this embodiment, the following directional terms "front", "rear", "forward", "rearward", "left", "right", "transverse", "upward" and "downward" as well as any other similar directional terms refer to those directions which are determined on the basis of the rider who sits on the saddle 7 of the bicycle 1 with facing the handlebar 3, for example. Accordingly, these terms, as utilized to describe the bicycle 1 including the bicycle chain 20 should be interpreted relative to the bicycle 1 as used in an upright riding position on a horizontal surface as illustrated in FIG. 1. These terms, as utilized to describe the bicycle chain 20 should be interpreted relative to the bicycle chain 20 as mounted on the bicycle 1 used in an upright riding position on a horizontal surface as illustrated in FIG. 1.

Figure 2:
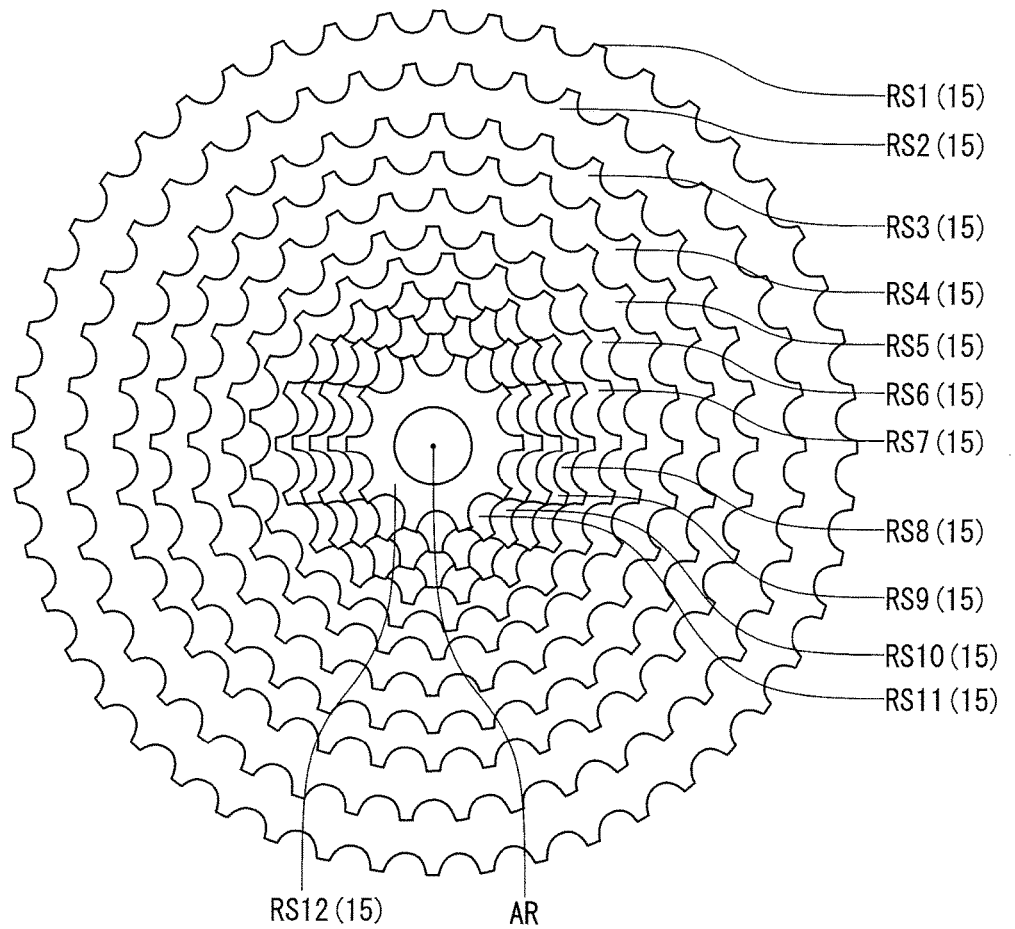
FIG. 2 is a side elevational view of a bicycle rear sprocket assembly in the drive train illustrated in FIG. 1.

Referring to FIG. 2, the bicycle rear sprocket assembly 14 includes bicycle rear sprockets RS1 to RS12 having different numbers of teeth from each other. In the illustrated embodiment, a total number of the bicycle rear sprockets RS1 to RS12 is twelve. However, the total number of the sprockets is not limited to twelve, but preferably, the total number of the bicycle rear sprockets is equal to or larger than nine. Preferably, all of the bicycle rear sprockets RS1 to RS12 are the bicycle rear sprockets 15. However, some of the bicycle rear sprockets RS1 to RS12 can be bicycle rear sprockets different from the bicycle rear sprocket 15. Namely, at least one of the bicycle rear sprockets RS1 to RS12 can be the bicycle rear sprocket 15. The bicycle rear sprockets RS1 to RS12 are rotatable relative to the bicycle frame 5 about a rotation center axis AR. The bicycle rear sprockets RS1 to RS12 are lined up in an axial direction parallel to the rotation center axis AR. In the illustrated embodiment, the smallest sprocket RS12 of the bicycle rear sprockets RS1 to RS12 has ten teeth. The largest sprocket RS1 of the bicycle rear sprockets RS1 to RS12 has forty-eight teeth. Therefore, a tooth-number difference between the smallest sprocket RS12 and the largest sprocket RS1 of the bicycle rear sprockets RS1 to RS12 is thirty-eight. In this embodiment, preferably, a tooth-number difference between a smallest sprocket and a largest sprocket of the bicycle rear sprockets is equal to or larger than twenty-five. More preferably, a tooth-number difference between a smallest sprocket and a largest sprocket of the bicycle rear sprockets is equal to or larger than thirty-five. A total number of tooth that a largest sprocket of the bicycle rear sprockets has is equal to or larger than forty-four. A total number of tooth that a smallest sprocket of the bicycle rear sprockets has is equal to or smaller than ten.

As illustrated in FIG. 1, the bicycle rear derailleur 18 is mounted on the bicycle frame 5 and is configured to guide the bicycle chain 20 from one rear sprocket to another adjacent rear sprocket among the bicycle rear sprockets RS1 to RS12. Since the bicycle rear derailleur 18 includes well known structures, they will not be described in detail herein.

Figure 3:
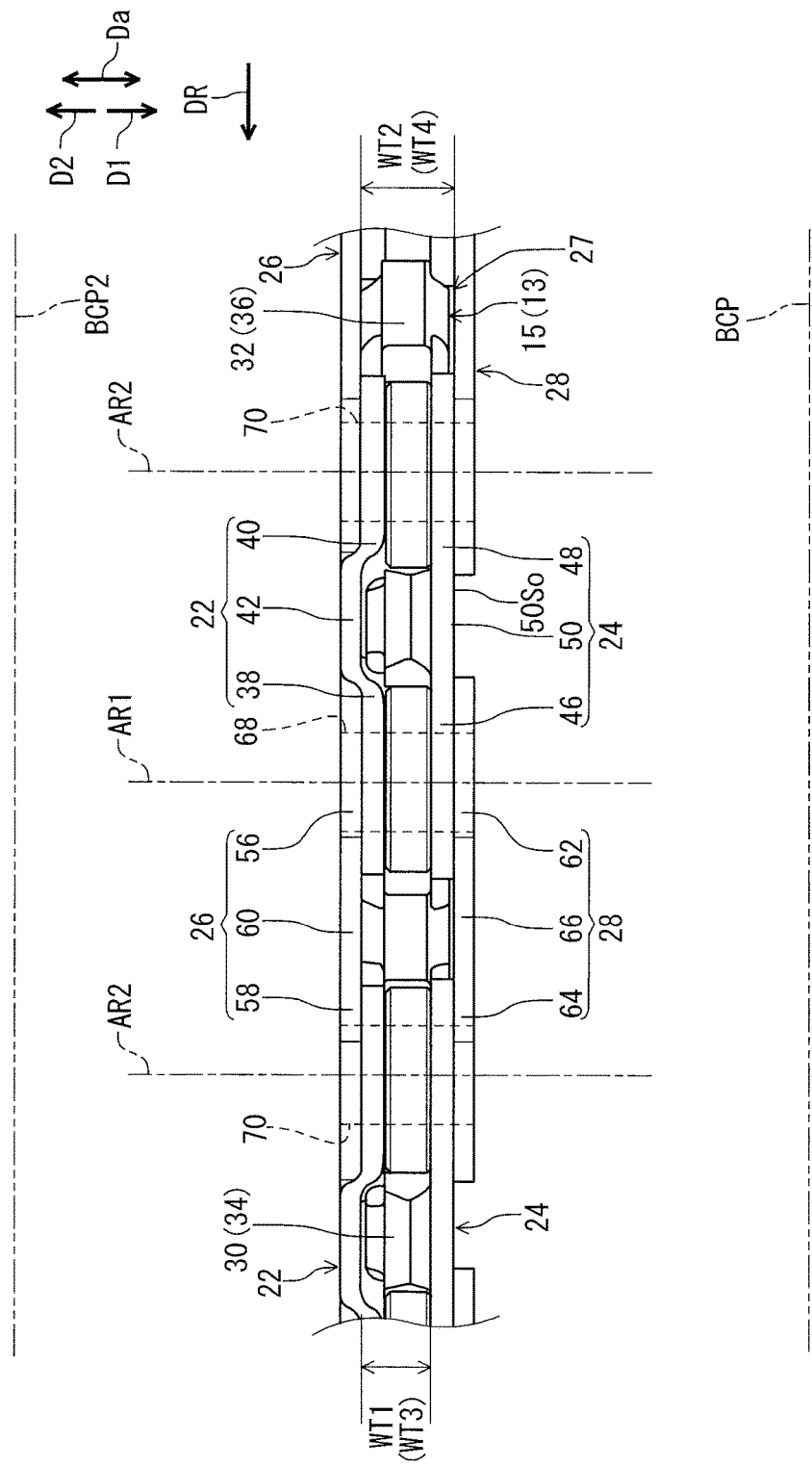
FIG. 3 is a partial plan view of the bicycle chain engaging each of a bicycle front sprocket and a bicycle rear sprocket illustrated in FIG. 1.

FIG. 3 illustrates the bicycle chain 20 engaging with each of the bicycle front sprocket 13 and the at least one bicycle rear sprocket 15. The bicycle chain 20 comprises a first inner link plate 22 and a second inner link plate 24. The bicycle chain 20 further comprises a first outer link plate 26 and a second outer link plate 28. The second inner link plate 24 is opposite to the first inner link plate 22 in the axial direction Da. More specifically, the second inner link plate 24 is spaced apart from the first inner link plate 22 in the axial direction Da in an assembled state where the bicycle chain 20 is assembled. The first inner link plate 22 and the second inner link plate 24 form an inner link space 23 therebetween. In other words, the second inner link plate 24 is spaced apart to provide the inner link space 23 between the first inner link plate 22 and the second inner link plate 24 in the assembled state. The second outer link plate 28 is opposite to the first outer link plate 26 in the axial direction Da. More specifically, the second outer link plate 28 is spaced apart from the first outer link plate 26 in the axial direction Da. The first outer link plate 26 and the second outer link plate 28 form an outer link space 27 therebetween. More specifically, the second outer link plate 28 is spaced apart to form an outer link space 27 between the first outer link plate 26 and the second outer link plate 28 in the assembled state.

FIG. 3 illustrates a bicycle center plane BCP to show a relative position of each component of the bicycle chain 20. As shown in FIG. 3, the first inner link plate 22 is disposed farther from the bicycle center plane BCP of the bicycle 1 than the second inner link plate 24 in a state where the bicycle chain 20 is mounted to the bicycle 1. In this specification, a direction toward a bicycle center plane BCP along the axial direction Da is referred to as a bicycle inward direction D1, and a direction opposite to the bicycle inward direction D1 along the axial direction Da is referred to as a bicycle outward direction D2.

The at least one bicycle rear sprocket 15 includes a first sprocket tooth 30 to be received in the inner link space 23 formed between the first inner link plate 22 and the second inner link plate 24. The at least one bicycle rear sprocket 15 further includes a second sprocket tooth 32 to be received in the outer link space 27 formed between the first outer link plate 26 and the second outer link plate 28. Further, the bicycle front sprocket 13 includes a third sprocket tooth 34 to be received in the inner link space 23 formed between the first inner link plate 22 and the second inner link plate 24. The bicycle front sprocket 13 further includes a fourth sprocket tooth 36 to be received in the outer link space 27 formed between the first outer link plate 26 and the second outer link plate 28. In other words, the inner link space 23 is configured to receive the sprocket tooth 30, 34 of the bicycle sprocket 15, 13. The outer link space 27 is configured to receive the sprocket tooth 32, 36 of the bicycle sprocket 15, 13.

Figure 4:
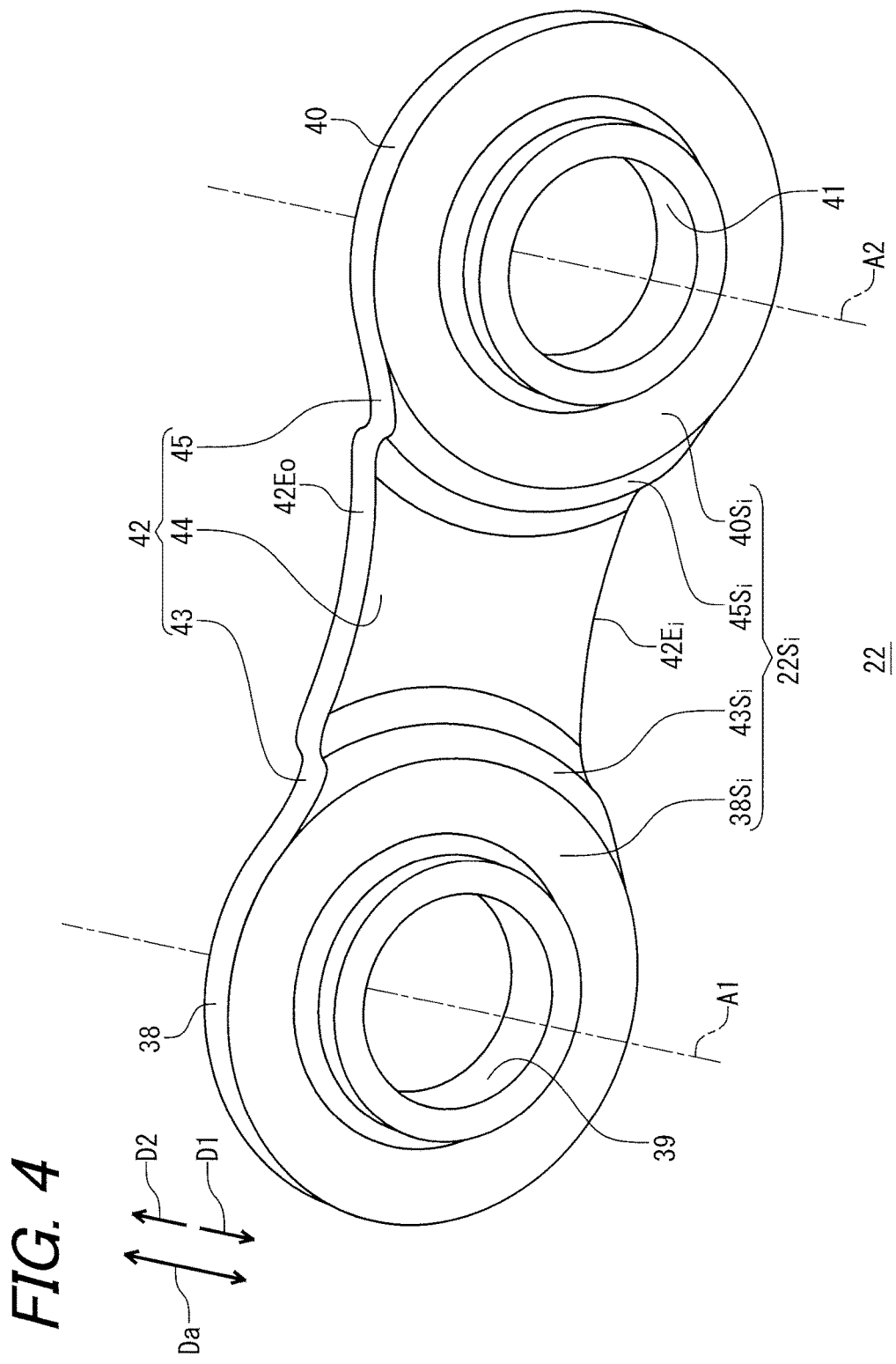
FIG. 4 is an inside perspective view of a first inner link plate illustrated in FIG. 3.
Figure 5:
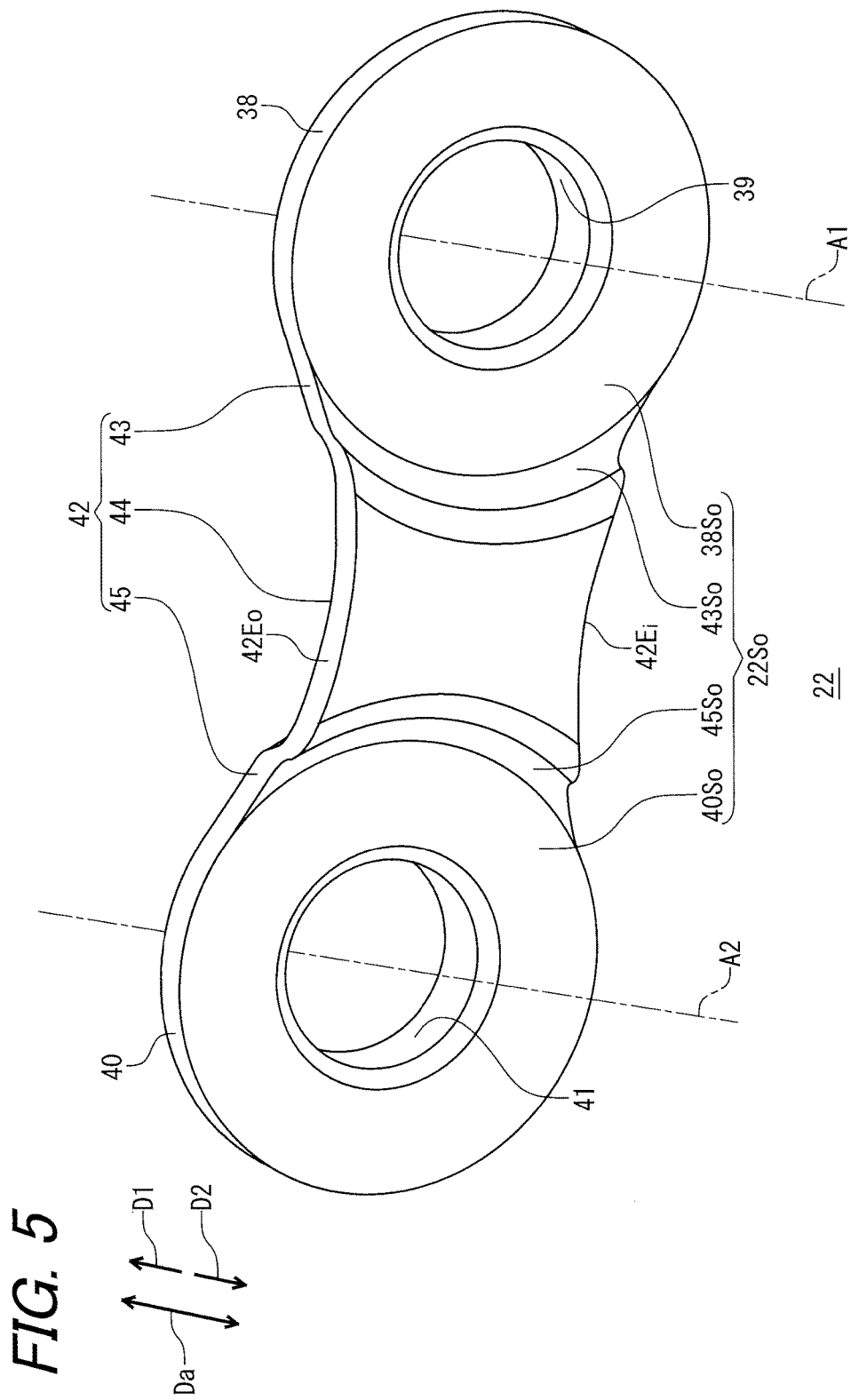
FIG. 5 is an outside perspective view of the first inner link plate illustrated in FIG. 3.

As seen in FIGS. 3 to 5, the first inner link plate 22 comprises a first end portion 38, a second end portion 40, and a first intermediate portion 42. The first end portion 38, the second end portion 40, and the first intermediate portion 42 are integrally provided with each other as a one-piece unitary member. The first inner link plate 22 is made of a hard and/or rigid material such as a metallic material. The first end portion 38 is positioned downstream of the second end portion 40 with respect to the chain driving direction DR in a state where the bicycle chain 20 engages with each of the bicycle front sprocket 13 and the bicycle rear sprocket 15. As seen in FIGS. 4 and 5, the first end portion 38 includes a first opening 39 having a first center axis A1. The second end portion 40 includes a second opening 41 having a second center axis A2. The axial direction Da is parallel to one of the first center axis A1 and the second center axis A2. While the first opening 39 and the second opening 41 are illustrated as two circular openings, it will be apparent to those skilled in the bicycle field that an elongated opening for the insertion of link pins 68 and 70 can be added to these openings. In such case, center axes of circular parts of the first opening 39 and the second opening 41 where the link pins 68 and 70 are locked in the assembled state can be the first center axis A1 and the second center axis A2, respectively.

The first intermediate portion 42 interconnects the first end portion 38 and the second end portion 40. Specifically, the first intermediate portion 42 includes a first connecting portion connecting part 43, an axial recess 44, and a second connecting portion connecting part 45. The first inner link plate 22 includes a first outer surface 22So and a first inner surface 22Si opposite to the first outer surface 22So in the axial direction Da. Specifically, the first inner surface 22Si faces toward the second inner link plate 24 in the assembled state. The first outer surface 22So is a reverse surface of the first inner surface 22Si in the axial direction Da. The first inner surface 22Si includes a first end portion inner surface 38Si, a second end portion inner surface 40Si, a first connecting portion connecting part inner surface 43Si, and a second connecting portion connecting part inner surface 45Si. The first outer surface 22So includes a first end portion outer surface 38So, a second end portion outer surface 40So, a first connecting portion connecting part outer surface 43So, and a second connecting portion connecting part outer surface 45So.

Figure 6:
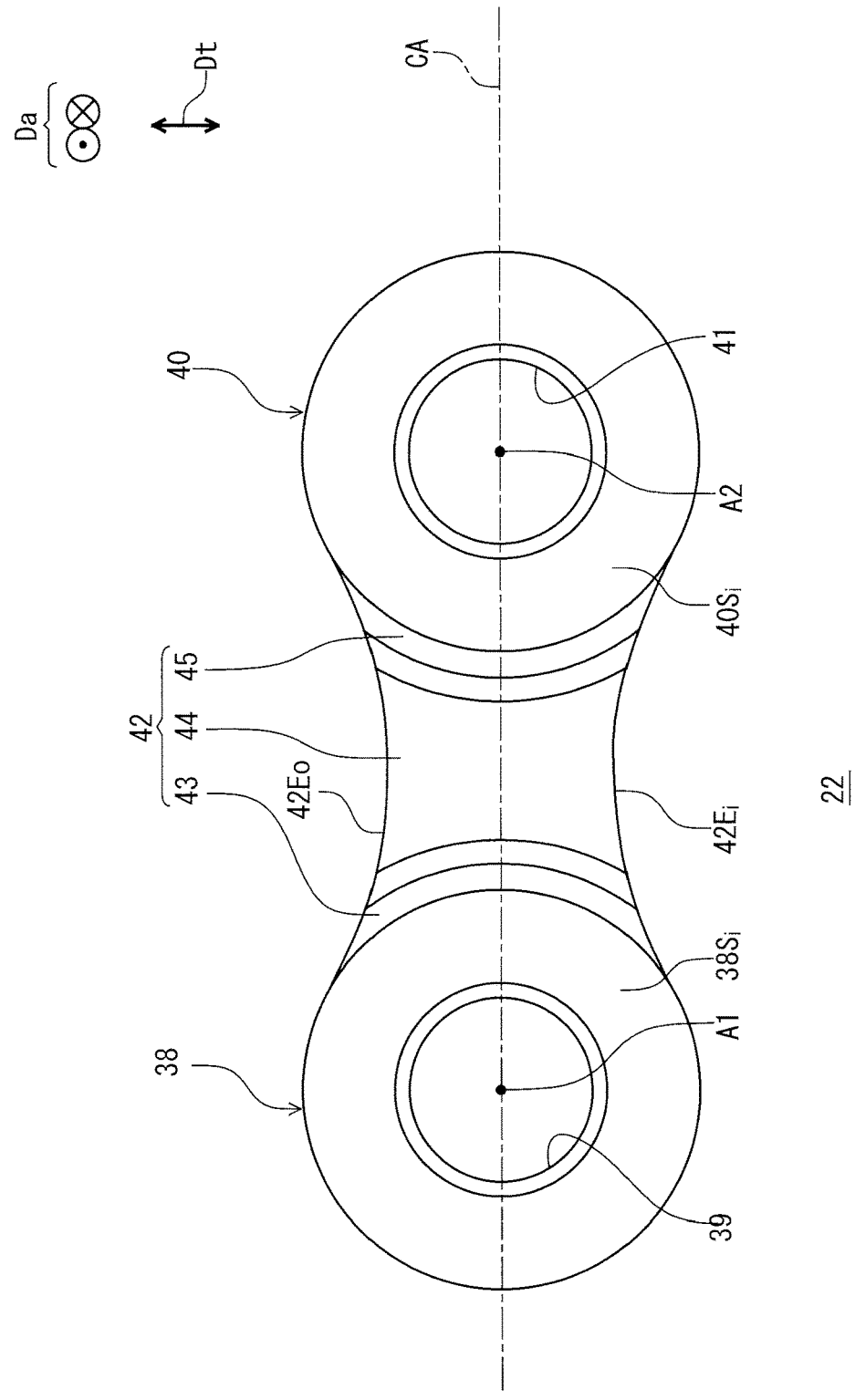
FIG. 6 is an inside elevational view of the first inner link plate illustrated in FIG. 3.

The first intermediate portion 42 of the first inner link plate 22 has the axial recess 44 formed on the first inner surface 22Si in the axial direction Da. The axial recess 44 is formed by bending the first inner link plate 22 at the first intermediate portion 42. Specifically, the axial recess 44 is offset from the first connecting portion connecting part inner surface 43Si and the second connecting portion connecting part inner surface 45Si in the bicycle outward direction D2. In other words, the axial recess 44 is offset from the first end portion inner surface 38Si and a second end portion inner surface 40Si in the bicycle outward direction D2. As seen in FIG. 6, the first inner link plate 22 has a longitudinal center axis CA as viewed from the axial direction Da. The axial recess 44 at least partly overlaps with the longitudinal center axis CA as viewed from the axial direction Da. The first intermediate portion 42 has a first edge 42Ei and a second edge 42Eo opposite to the first edge 42Ei in a transverse direction Dt perpendicular to the longitudinal center axis CA. The first edge 42Ei is closer to the rotation center axis AR of the bicycle rear sprocket assembly 14 than the second edge 42Eo in the state where the bicycle chain 20 is mounted to the bicycle 1. The axial recess 44 extends from the first edge 42Ei to the second edge 42Eo.

Figure 7:
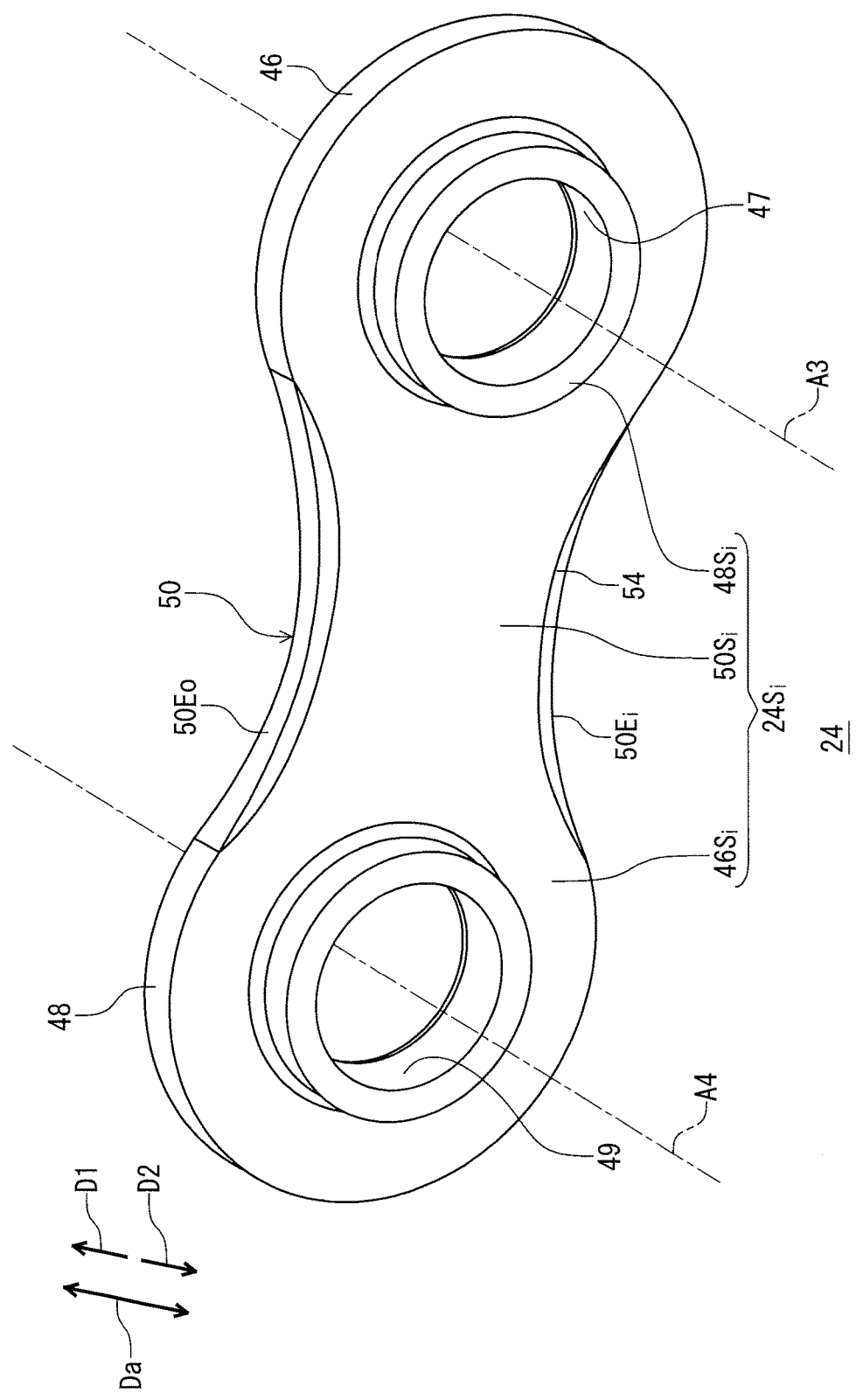
FIG. 7 is an inside perspective view of a second inner link plate illustrated in FIG. 3.
Figure 8:
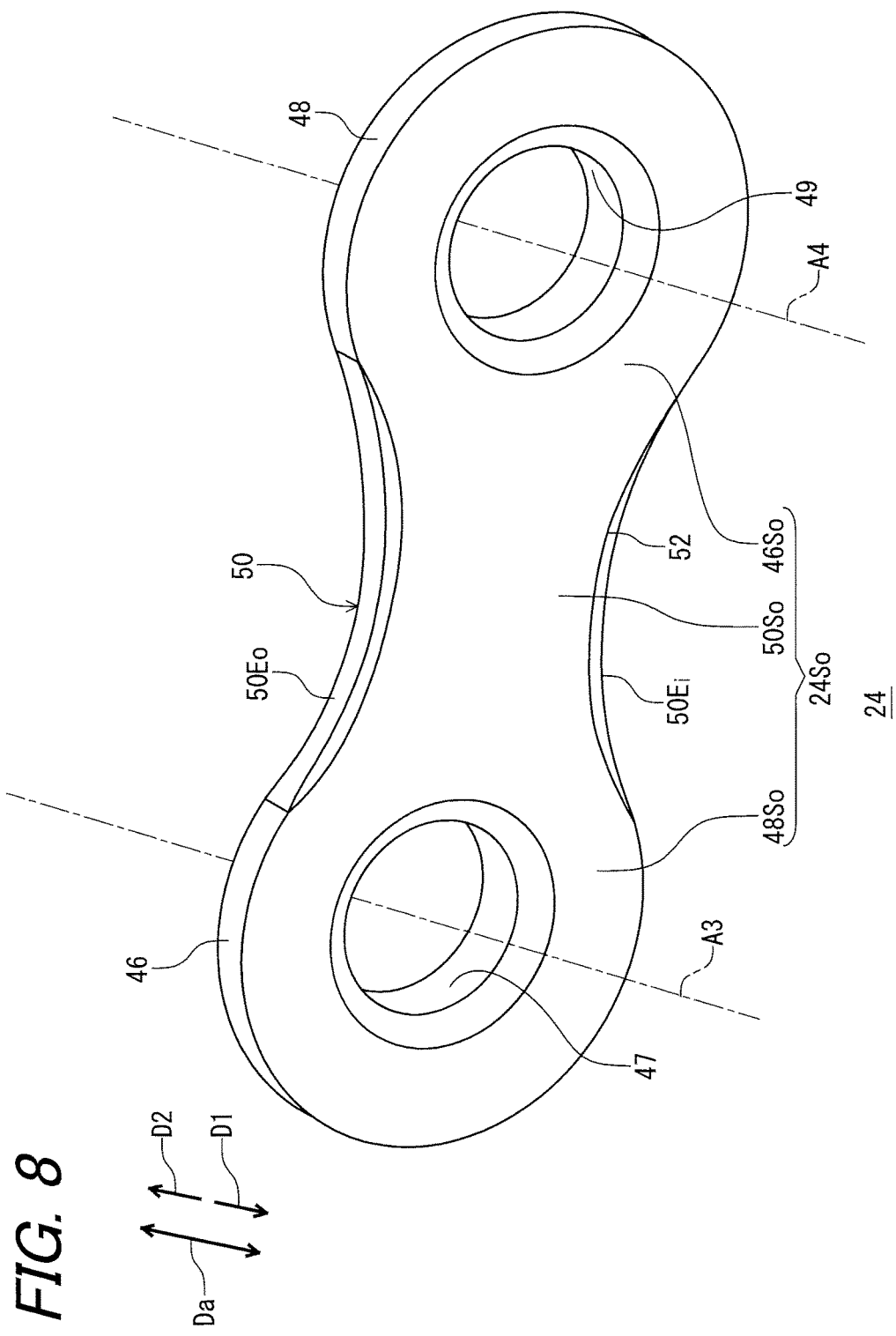
FIG. 8 is an outside perspective view of the second inner link plate illustrated in FIG. 3.

As seen in FIGS. 3, 7, and 8, the second inner link plate 24 is spaced apart from the first inner link plate 22 in the axial direction Da parallel to one of the first center axis A1 and the second center axis A2 in the assembled state where the bicycle chain 20 is assembled. The second inner link plate 24 comprises a third end portion 46, a fourth end portion 48, and a second intermediate portion 50. The third end portion 46, the fourth end portion 48, and the second intermediate portion 50 are integrally provided with each other as a one-piece unitary member. The second inner link plate 24 is made of a hard and/or rigid material such as a metallic material. The third end portion 46 is positioned downstream of the fourth end portion 48 with respect to the chain driving direction DR in the state where the bicycle chain 20 engages with each of the bicycle front sprocket 13 and the bicycle rear sprocket 15. The third end portion 46 includes a third opening 47 having a third center axis A3. The fourth end portion 48 includes a fourth opening 49 having a fourth center axis A4. While the third opening 47 and the fourth opening 49 are illustrated as two circular openings, it will be apparent to those skilled in the bicycle field that an elongated opening for the insertion of link pins 68 and 70 can be added to these openings. In such case, center axes of circular parts of the third opening 47 and the fourth opening 49 where the link pins 68 and 70 are locked in the assembled state can be the third center axis A3 and the fourth center axis A4, respectively.

The second intermediate portion 50 interconnects the third end portion 46 and the fourth end portion 48. The third center axis A3 substantially coincides with the first center axis A1 in the assembled state. The fourth center axis A4 substantially coincides with the second center axis A2 in the assembled state. Accordingly, the third end portion 46 faces the first end portion 38 in the axial direction Da. The fourth end portion 48 faces the second end portion 40 in the axial direction Da. The second intermediate portion 50 faces the first intermediate portion 42 in the axial direction Da.

The second inner link plate 24 includes a second outer surface 24So and a second inner surface 24Si opposite to the second outer surface 24So in the axial direction Da. The first inner surface 22Si and the second inner surface 24Si are configured to face each other in the assembled state. The second intermediate portion 50 of the second inner link plate 24 is free from an axial recess formed on the second inner surface 24Si of the second intermediate portion 50 in the axial direction Da. Specifically, the second inner surface 24Si includes a third end portion inner surface 46Si, a fourth end portion inner surface 48Si, and a second intermediate portion inner surface 50Si. The third end portion inner surface 46Si is the second inner surface 24Si of the third end portion 46. The fourth end portion inner surface 48Si is the second inner surface 24Si of the fourth end portion 48. The second intermediate portion inner surface 50Si is the second inner surface 24Si of the second intermediate portion 50. The third end portion inner surface 46Si, the fourth end portion inner surface 48Si, and the second intermediate portion inner surface 50Si constitute a single flat surface. The second outer surface 24So includes a third end portion outer surface 46So, a fourth end portion outer surface 48So, and a second intermediate portion outer surface 50So. The third end portion outer surface 46So is the second outer surface 24So of the third end portion 46. The fourth end portion outer surface 48So is the second outer surface 24So of the fourth end portion 48. The second intermediate portion outer surface 50So is the second outer surface 24So of the second intermediate portion 50. The third end portion outer surface 46So, the fourth end portion outer surface 48So, and the second intermediate portion outer surface 50So constitute a single flat surface.

As seen in FIG. 8, the second intermediate portion 50 has a third edge 50Ei and a fourth edge 50Eo. The third edge 50Ei is closer to the rotation center axis AR of the bicycle rear sprocket assembly 14 than the fourth edge 50Eo in the state where the bicycle chain 20 is mounted to the bicycle 1. In the below description, the third edge 50Ei can be simply referred to as the edge 50Ei, and it can also be described that the second intermediate portion 50 has the edge 50Ei. The second intermediate portion 50 includes a chamfer 52 formed on the edge 50Ei. In the below description, the chamfer 52 can be referred to a first chamfer 52. The first chamfer 52 is formed on the second intermediate portion outer surface 50So which is the second outer surface 24So of the second intermediate portion 50. As seen in FIG. 3, the second intermediate portion outer surface 50So faces the bicycle center plane BCP of the bicycle 1. Accordingly, the chamfer 52 is configured to facilitate a shifting operation, and it is less possible that the axial recess 44 interferes with the shifting operation of the bicycle rear sprockets RS1 to RS12.

Further, as seen in FIG. 7, the second intermediate portion 50 includes a second chamfer 54 formed on the edge 50Ei. The second chamfer 54 is formed on the second intermediate portion inner surface 50Si which is the second inner surface 24Si of the second intermediate portion 50. The second intermediate portion inner surface 50Si is opposite to the second intermediate portion outer surface 50So in the axial direction Da, thereby the second chamfer 54 is configured to facilitate the engagement between the bicycle chain 20 and each of the first sprocket tooth 30 of the bicycle rear sprocket 15 and the third sprocket tooth 34 of the bicycle front sprocket 13.

Figure 9:
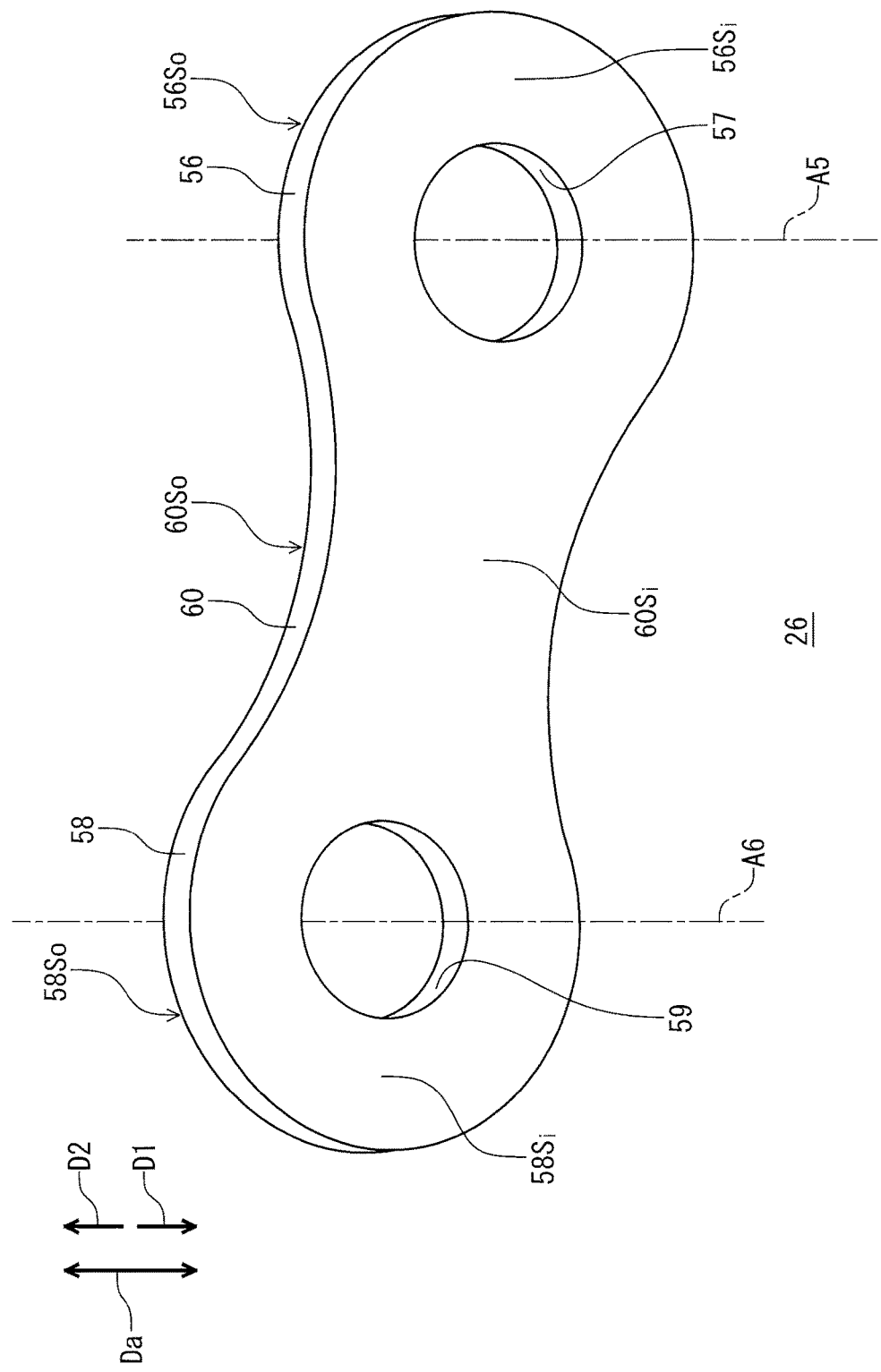
FIG. 9 is a perspective view of a first outer link plate illustrated in FIG. 3.

As seen in FIGS. 3 and 9, the first outer link plate 26 comprises a fifth end portion 56, a sixth end portion 58, and a third intermediate portion 60. The fifth end portion 56, the sixth end portion 58, and the third intermediate portion 60 are integrally provided with each other as a one-piece unitary member. The first outer link plate 26 is made of a hard and/or rigid material such as a metallic material. The fifth end portion 56 is positioned upstream of the sixth end portion 58 with respect to the chain driving direction DR in the state where the bicycle chain 20 engages with each of the bicycle front sprocket 13 and the bicycle rear sprocket 15. The fifth end portion 56 includes a fifth opening 57 having a fifth center axis A5. The sixth end portion 58 includes a sixth opening 59 having a sixth center axis A6. While the fifth opening 57 and the sixth opening 59 are illustrated as two circular openings, it will be apparent to those skilled in the bicycle field that an elongated opening for the insertion of link pins 68 and 70 can be added to these openings. In such case, center axes of circular parts of the fifth opening 57 and the sixth opening 59 where the link pins 68 and 70 are locked in the assembled state can be the fifth center axis A5 and the sixth center axis A6, respectively.

The third intermediate portion 60 interconnects the fifth end portion 56 and the sixth end portion 58. The fifth center axis A5 substantially coincides with the first center axis A1 in the assembled state. The sixth center axis A6 substantially coincides with the second center axis A2 of another first inner link plate 22 in the assembled state. Accordingly, as seen in FIG. 3, the fifth end portion 56 contacts with the first end portion 38 of the first inner link plate 22. The sixth end portion 58 contacts with the second end portion 40 of another first inner link plate 22. Further, an inner surface 56Si of the fifth end portion 56, an inner surface 58Si of the sixth end portion 58, and an inner surface 60Si of the third intermediate portion 60 constitute a single flat surface. An outer surface 56So of the fifth end portion 56, an outer surface 58So of the sixth end portion 58, and an outer surface 60So of the third intermediate portion 60 constitute a single flat surface. Accordingly, the third intermediate portion 60 of the first outer link plate 26 is free from an axial recess formed on the inner surface 60Si of the third intermediate portion 60 in the axial direction Da.

Figure 10:
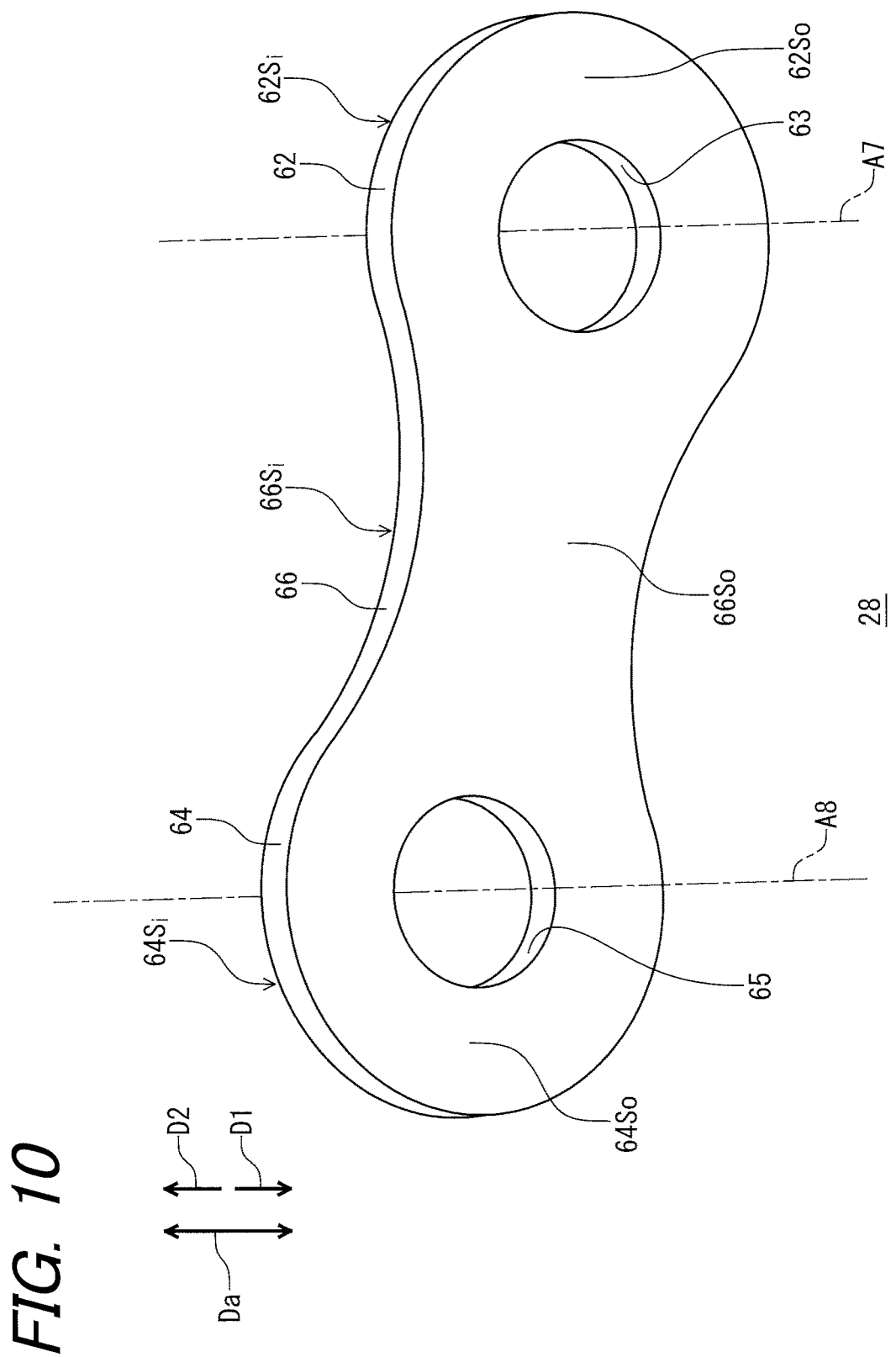
FIG. 10 is a perspective view of a second outer link plate illustrated in FIG. 3.

As seen in FIGS. 3 and 10, the second outer link plate 28 has a substantially same structure as the first outer link plate 26. The second outer link plate 28 comprises a seventh end portion 62, an eighth end portion 64, and a fourth intermediate portion 66. The seventh end portion 62, the eighth end portion 64, and the fourth intermediate portion 66 are integrally provided with each other as a one-piece unitary member. The second outer link plate 28 is made of a hard and/or rigid material such as a metallic material. The seventh end portion 62 is positioned upstream of the eighth end portion 64 with respect to the chain driving direction DR in the state where the bicycle chain 20 engages with each of the bicycle front sprocket 13 and the bicycle rear sprocket 15. The seventh end portion 62 includes a seventh opening 63 having a seventh center axis A7. The eighth end portion 64 includes an eighth opening 65 having an eighth center axis A8. While the seventh opening 63 and the eighth opening 65 are illustrated as two circular openings, it will be apparent to those skilled in the bicycle field that an elongated opening for the insertion of link pins 68 and 70 can be added to these openings. In such case, center axes of circular parts of the seventh opening 63 and the eighth opening 65 where the link pins 68 and 70 are locked in the assembled state can be the seventh center axis A7 and the eighth center axis A8, respectively.

The fourth intermediate portion 66 interconnects the seventh end portion 62 and the eighth end portion 64. The seventh center axis A7 substantially coincides with the third center axis A3 in the assembled state. The eighth center axis A8 substantially coincides with the fourth center axis A4 of another second inner link plate 24 in the assembled state. Accordingly, as seen in FIG. 3, the seventh end portion 62 contacts with the third end portion 46 of the second inner link plate 24. The eighth end portion 64 contacts with the fourth end portion 48 of another second inner link plate 24. Further, an inner surface 62Si of the seventh end portion 62, an inner surface 64Si of the eighth end portion 64, and an inner surface 66Si of the fourth intermediate portion 66 constitute a single flat surface. An outer surface 62So of the seventh end portion 62, an outer surface 64So of the eighth end portion 64, and an outer surface 66So of the fourth intermediate portion 66 constitute a single flat surface. Accordingly, the fourth intermediate portion 66 of the second outer link plate 28 is free from an axial recess formed on the inner surface 66Si of the fourth intermediate portion 66 in the axial direction Da.

Figure 11:
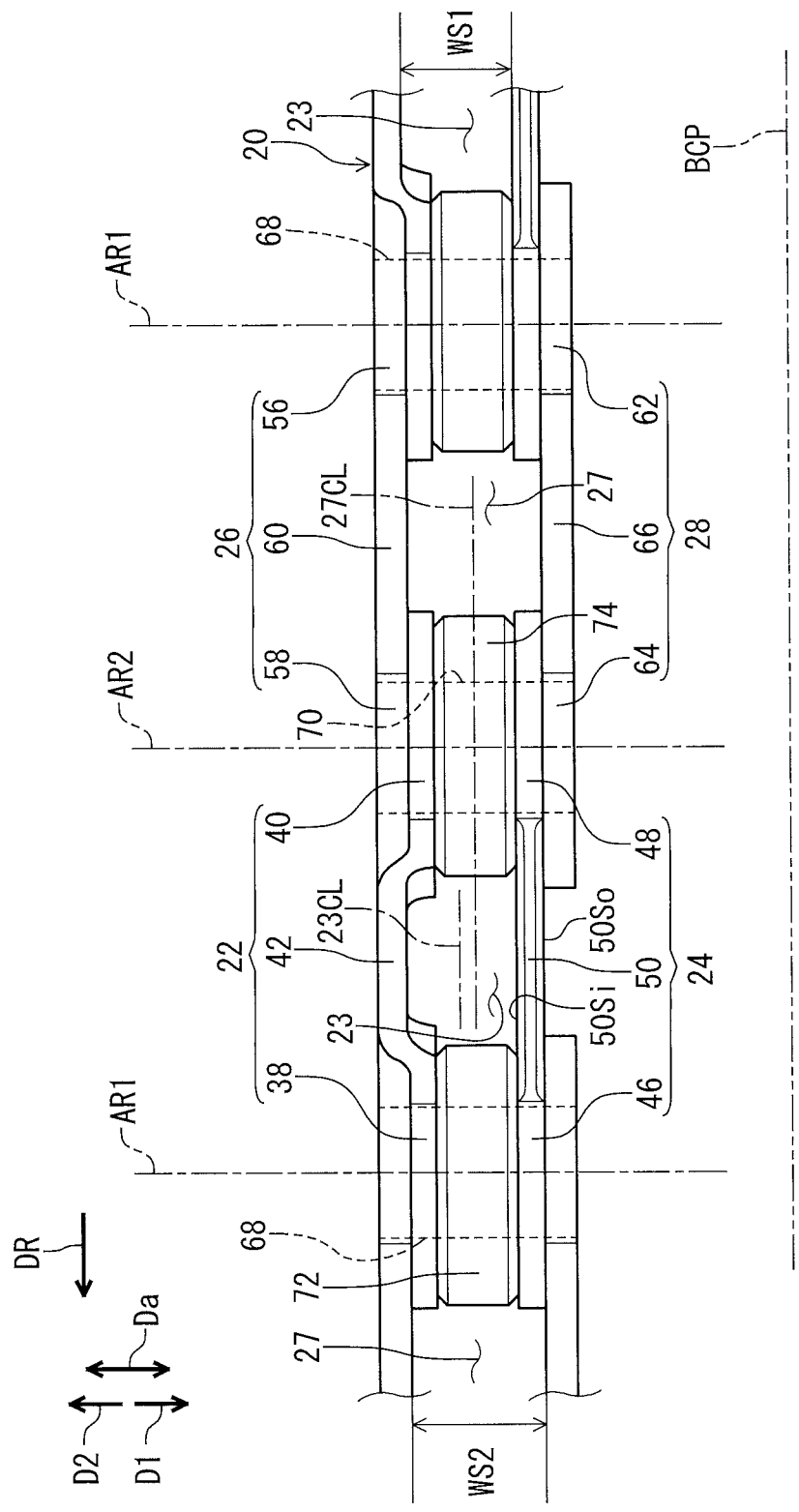
FIG. 11 is a partial plan view of the bicycle chain illustrated in FIG. 1.

As illustrated in FIGS. 3 and 11, the bicycle chain 20 includes the first link pins 68 and the second link pins 70 alternatively arranged in the chain driving direction DR. Each of the first link pins 68 has a cylindrical shape and a first pin center axis AR1. Each of the second link pins 70 has a cylindrical shape and a second pin center axis AR2. Each of the first link pins 68 extends through the first opening 39, the third opening 47, the fifth opening 57 and the seventh opening 63 in the assembled state. Accordingly, the first pin center axis AR1 substantially coincides with the first center axis A1, the third center axis A3, the fifth center axis A5, and the seventh center axis A7. Each of the second link pins 70 extends through the second opening 41, the fourth opening 49, the sixth opening 59 and the eighth opening 65 in the assembled state. Accordingly, the second pin center axis AR2 substantially coincides with the second center axis A2, the fourth center axis A4, the sixth center axis A6, and the eighth center axis A8.

Each of the first link pins 68 is configured to rotatably couple the first end portion 38 of the first inner link plate 22 and the fifth end portion 56 of the first outer link plate 26 about the first pin center axis AR1. Each of the first link pins 68 is configured to rotatably couple the third end portion 46 of the second inner link plate 24 and the seventh end portion 62 of the second outer link plate 28 about the first pin center axis AR1.

Each of the second link pins 70 is configured to rotatably couple the second end portion 40 of the first inner link plate 22 and the sixth end portion 58 of the first outer link plate 26 about the second pin center axis AR2. Each of the second link pins 70 is configured to rotatably couple the fourth end portion 48 of the second inner link plate 24 and the eighth end portion 64 of the second outer link plate 28 about the second pin center axis AR2.

Further, the bicycle chain 20 includes the first rollers 72 and the second rollers 74 provided between the first inner link plates 22 and the second inner link plates 24. The first rollers 72 and the second rollers 74 are alternatively arranged in the chain driving direction DR. More specifically, each of the first rollers 72 is provided between the first end portion 38 of the first inner link plate 22 and the third end portion 46 of the second inner link plate 24. Each of the second rollers 74 is provided between the second end portion 40 of the first inner link plate 22 and the fourth end portion 48 of the second inner link plate 24. Each of the first rollers 72 is rotatable relative to the opposed pair of the first inner link plate 22 and the second inner link plate 24 about the first pin center axis AR1. Each of the first rollers 72 has an annular shape and is configured to engage with the teeth of each of the bicycle front sprocket 13 and the bicycle rear sprocket 15. Each of the second rollers 74 is rotatable relative to the opposed pair of the first inner link plate 22 and the second inner link plate 24 about the second pin center axis AR2. Each of the second rollers 74 has an annular shape and is configured to engage with the teeth of each of the bicycle front sprocket 13 and the bicycle rear sprocket 15. While the first rollers 72 have substantially the same shape as a shape of the second rollers 74, it will be apparent to those skilled in the bicycle field that the first rollers 72 can have a different shape from the shape of the second rollers 74. Since the first rollers 72 and the second rollers 74 include well know structures, they will not be described in detail herein.

As seen in FIG. 11, the inner link space 23 is formed by the first inner link plate 22, the second inner link plate 24, the first roller 72, and the second roller 74. The inner link space 23 has a longitudinal inner link space center line 23CL. The outer link space 27 is formed by the first outer link plate 26, the second outer link plate 28, the first roller 72, and the second roller 74. The outer link space 27 has a longitudinal outer link space center line 27CL that is offset from the longitudinal inner link space center line 23CL in the axial direction Da. The inner link space 23 has a first maximum transverse width WS1. The first maximum transverse width WS1 ranges from 2.1 mm to 3.6 mm. Preferably, the first maximum transverse width WS1 ranges from 2.7 mm to 3.6 mm. The outer link space 27 has a second maximum transverse width WS2. The second maximum transverse width WS2 is equal to or less than 4.1 mm. Preferably, the second maximum transverse width WS2 ranges from 3.6 mm to 4.1 mm. The first maximum transverse width WS1 divided by the second maximum transverse width WS2 is equal to or larger than 0.6. Preferably, the first maximum transverse width WS1 divided by the second maximum transverse width WS2 is equal to or larger than 0.7 and equal to or less than 0.75.

As seen in FIG. 3, the first sprocket tooth 30 has a first chain engaging width WT1. The second sprocket tooth 32 has a second chain engaging width WT2 that is larger than the first chain engaging width WT1 in the axial direction Da. The first chain engaging width WT1 is shorter than the first maximum transverse width WS1 of the inner link space 23. The second chain engaging width WT2 is larger than the first maximum transverse width WS1 of the inner link space 23 and shorter than the second maximum transverse width WS2 of the outer link space 27. The third sprocket tooth 34 has a third chain engaging width WT3. The fourth sprocket tooth 36 has a fourth chain engaging width WT4 that is larger than the third chain engaging width WT3 in the axial direction Da. The third chain engaging width WT3 is shorter than the first maximum transverse width WS1 of the inner link space 23. The fourth chain engaging width WT4 is larger than the first maximum transverse width WS1 of the inner link space 23 and shorter than the second maximum transverse width WS2 of the outer link space 27.

Figure 12:
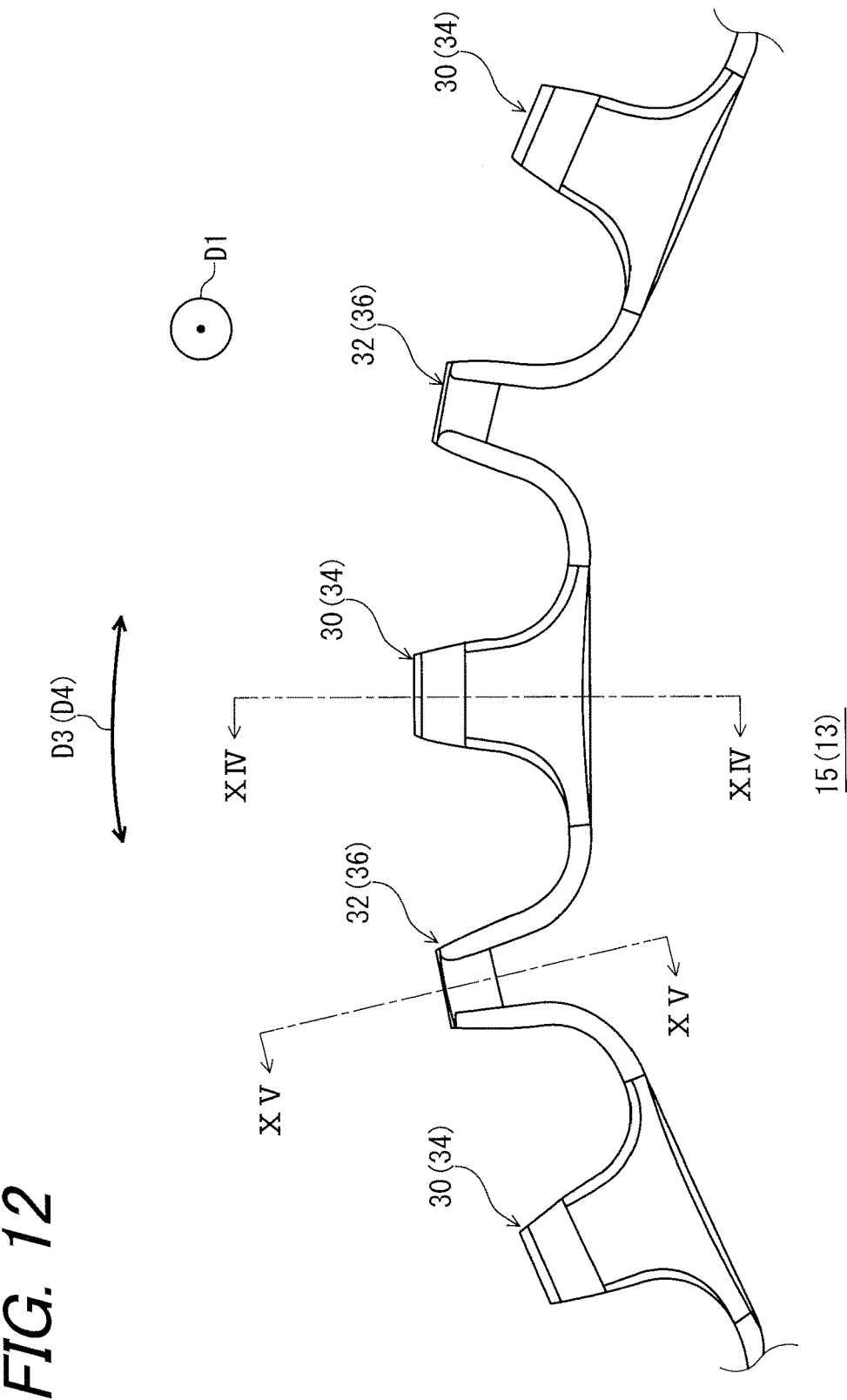
FIG. 12 is a partial elevational view of each of the bicycle front sprocket and the bicycle rear sprocket illustrated in FIG. 1.
Figure 13:
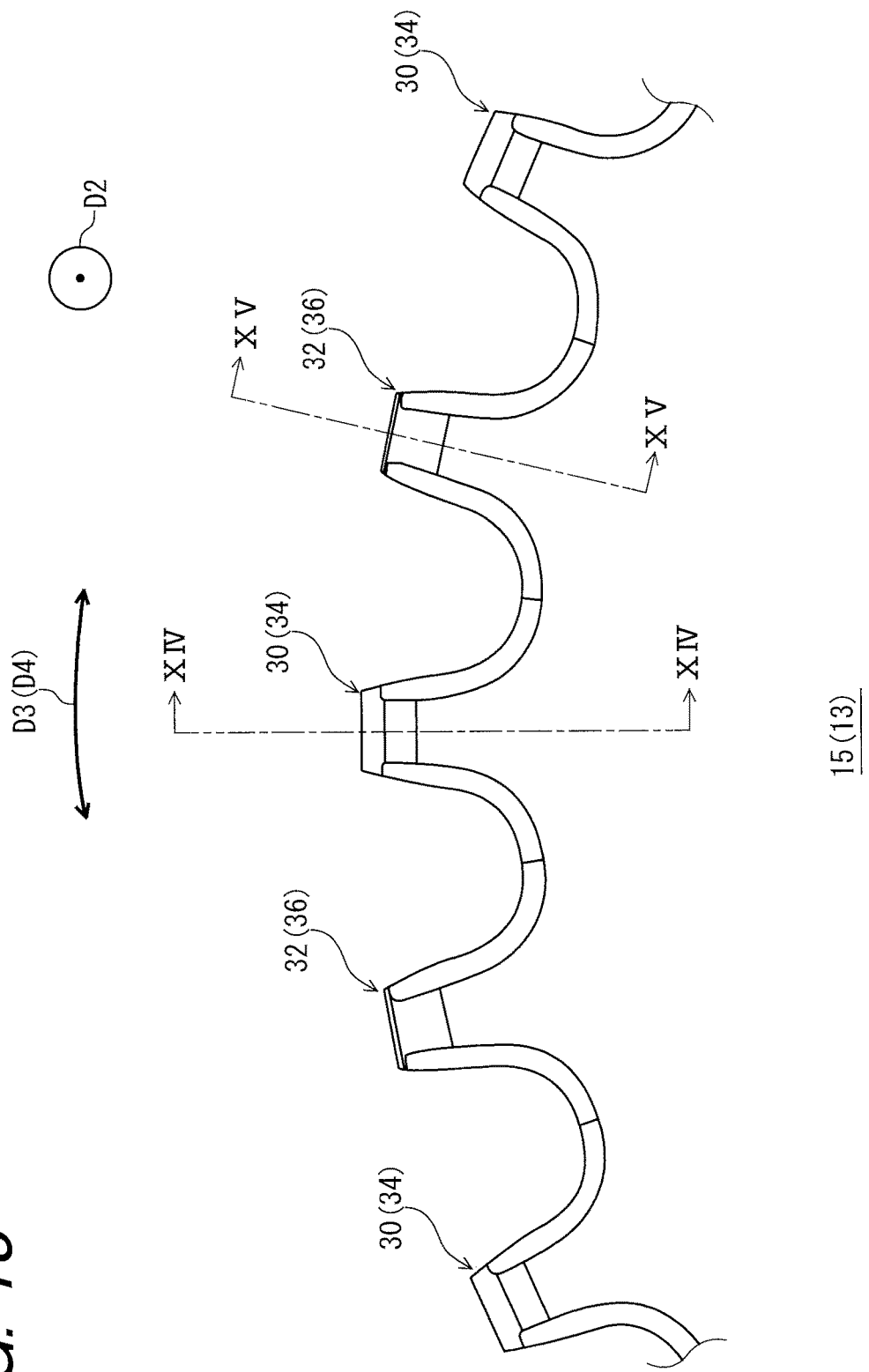
FIG. 13 is another partial elevational view of each of the bicycle front sprocket and the bicycle rear sprocket illustrated in FIG. 1.

As seen in FIGS. 12 and 13, the first sprocket teeth 30 and the second sprocket teeth 32 are alternately arranged in the first circumferential direction D3 with respect to the rotation center axis AR of the bicycle rear sprocket 15 such that the first sprocket teeth 30 and the second sprocket teeth 32 are configured to be received in the inner link spaces 23 and the outer link spaces 27, respectively. The third sprocket teeth 34 and the fourth sprocket teeth 36 are alternately arranged in the second circumferential direction D4 with respect to a rotation center axis FAR (See FIG. 1) of the bicycle front sprocket 13 such that the third sprocket teeth 34 and the fourth sprocket teeth 36 are configured to be received in the inner link spaces 23 and the outer link spaces 27, respectively.

Figure 14:
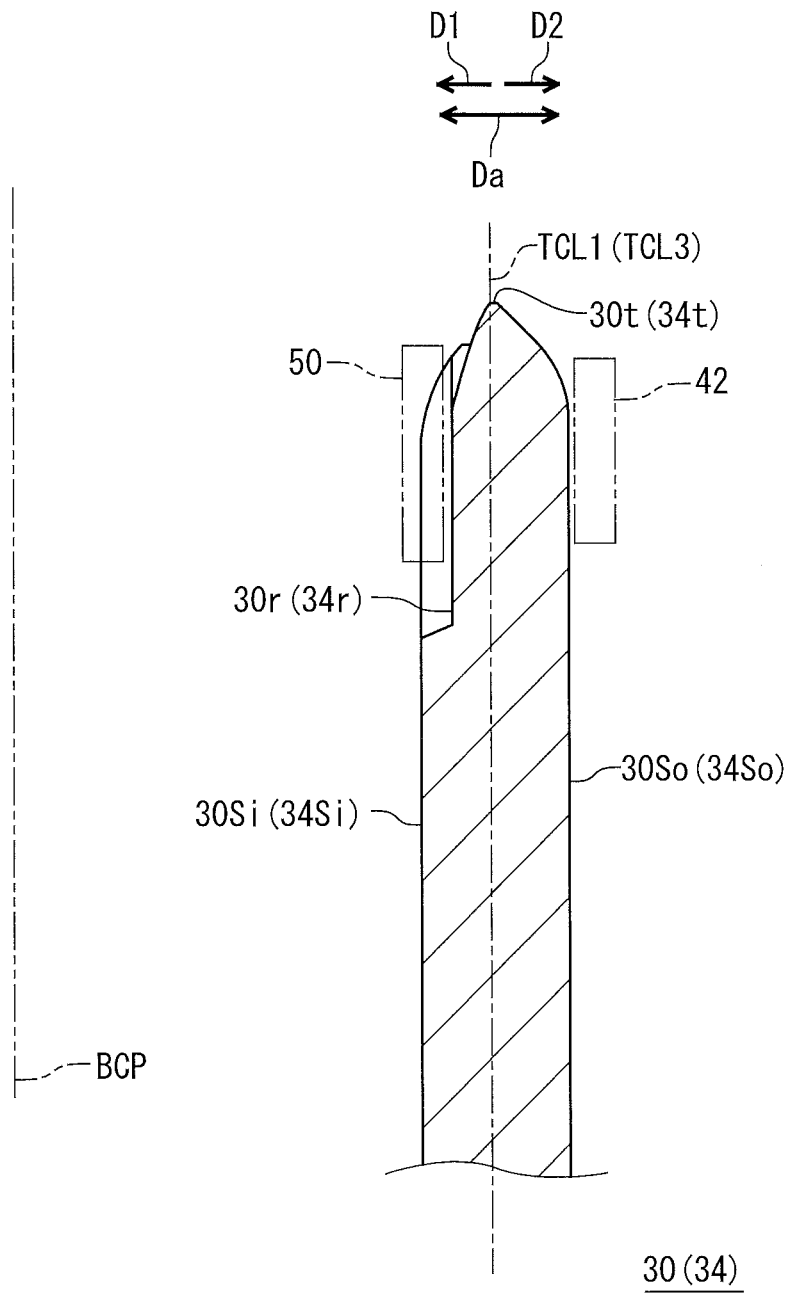
FIG. 14 is a cross sectional view of each of the first sprocket tooth and the third sprocket tooth taken along line XIV-XIV of the FIGS. 12 and 13.

As seen in FIG. 14, each of the first sprocket teeth 30 has a first inner tooth surface 30Si and a first outer tooth surface 30So. The first inner tooth surface 30Si faces the bicycle center plane BCP of the bicycle 1 in the axial direction Da. The first outer tooth surface 30So is opposite to the first inner tooth surface 30Si in the axial direction Da. Each of the first sprocket teeth 30 has a first axial recess 30r recessed from the first inner tooth surface 30Si in the bicycle outward direction D2 such that the first sprocket tooth 30 is received between the first intermediate portion 42 and the second intermediate portion 50 in the axial direction Da. Accordingly, the first sprocket tooth 30 has an asymmetrical shape with respect to an axial tooth center plane TCL1 of the first sprocket tooth 30. The first axial recess 30r is configured to face the second intermediate portion 50 in the axial direction Da in a state where the bicycle chain 20 engages with the first sprocket tooth 30. The first outer tooth surface 30So is configured to face the first intermediate portion 42 in the axial direction Da in the state where the bicycle chain 20 engages with the first sprocket tooth 30. The first sprocket tooth 30 has a first tooth tip 30t on the axial tooth center plane TCL1. The first tooth tip 30t is sharp such that the first intermediate portion 42 and the second intermediate portion 50 slide respectively on the first outer tooth surface 30So and the first inner tooth surface 30Si to reach appropriate positions when the bicycle chain 20 is engaging the first sprocket tooth 30.

Similarly, each of the third sprocket teeth 34 has a third inner tooth surface 34Si and a third outer tooth surface 34So. The third inner tooth surface 34Si faces the bicycle center plane BCP of the bicycle 1 in the axial direction Da. The third outer tooth surface 34So is opposite to the third inner tooth surface 34Si in the axial direction Da. Each of the third sprocket teeth 34 has a third axial recess 34r recessed from the third inner tooth surface 34Si in the bicycle outward direction D2 such that the third sprocket tooth 34 is received between the first intermediate portion 42 and the second intermediate portion 50 in the axial direction Da. Accordingly, the third sprocket tooth 34 has an asymmetrical shape with respect to an axial tooth center plane TCL3 of the third sprocket tooth 34. The third axial recess 34r is configured to face the second intermediate portion 50 in the axial direction Da in a state where the bicycle chain 20 engages with the third sprocket tooth 34. The third outer tooth surface 34So is configured to face the first intermediate portion 42 in the axial direction Da in the state where the bicycle chain 20 engages with the third sprocket tooth 34. The third sprocket tooth 34 has a third tooth tip 34t on the axial tooth center plane TCL3. The third tooth tip 34t is sharp such that the first intermediate portion 42 and the second intermediate portion 50 slide respectively on the third outer tooth surface 34So and the third inner tooth surface 34Si to reach appropriate positions when the bicycle chain 20 is engaging the third sprocket tooth 34.

Figure 15:
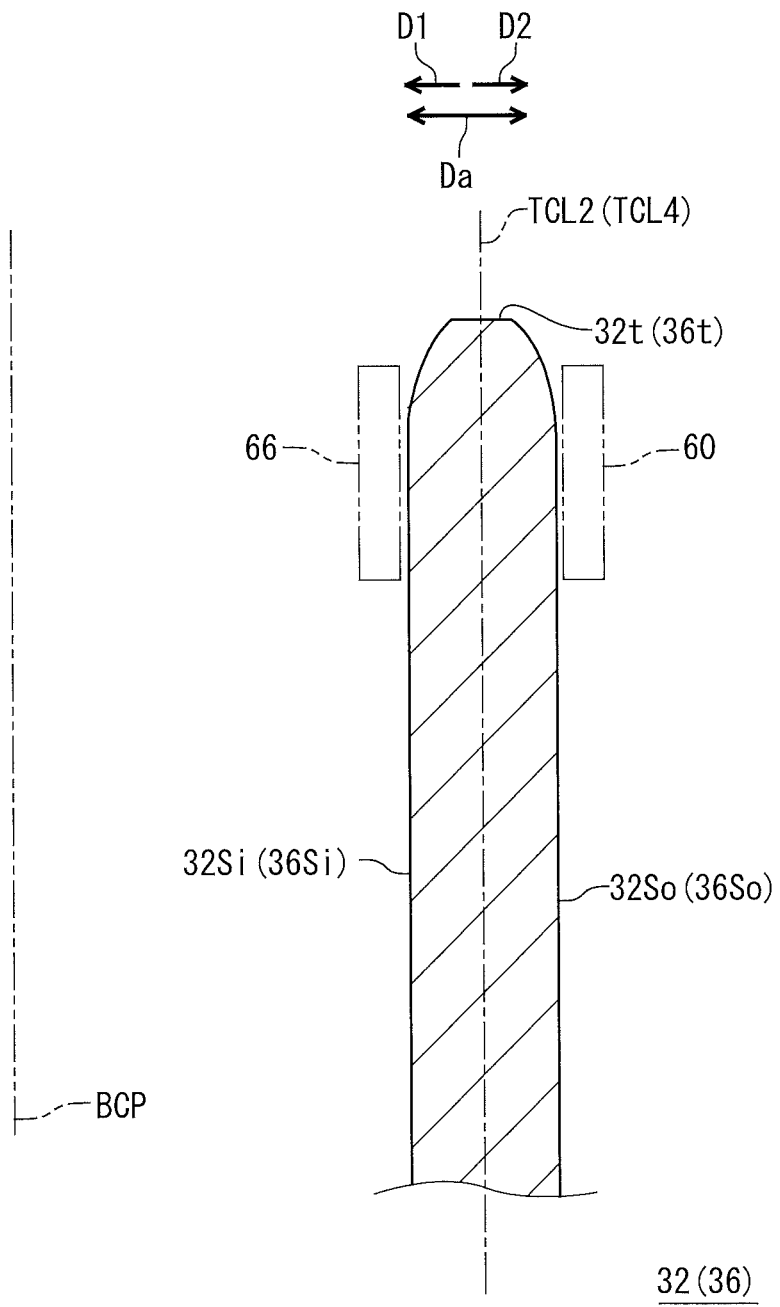
FIG. 15 is a cross sectional view of each of the second sprocket tooth and the fourth sprocket tooth taken along line XV-XV of the FIGS. 12 and 13.

As seen in FIG. 15, each of the second sprocket teeth 32 has a second inner tooth surface 32Si and a second outer tooth surface 32So. The second inner tooth surface 32Si faces the bicycle center plane BCP of the bicycle 1 in the axial direction Da. The second outer tooth surface 32So is opposite to the second inner tooth surface 32Si in the axial direction Da. The second sprocket tooth 32 has a symmetrical shape with respect to an axial tooth center plane TCL2 of the second sprocket tooth 32. The second inner tooth surface 32Si is configured to face the fourth intermediate portion 66 in the axial direction Da in a state where the bicycle chain 20 engages with the second sprocket tooth 32. The second outer tooth surface 32So is configured to face the third intermediate portion 60 in the axial direction Da in the state where the bicycle chain 20 engages with the second sprocket tooth 32. The second sprocket tooth 32 has a second tooth tip 32t crossing the axial tooth center plane TCL2. In the illustrated embodiment, the second tooth tip 32t is flat, but the second tooth tip 32t can be sharp.

Similarly, each of the fourth sprocket teeth 36 has a fourth inner tooth surface 36Si and a fourth outer tooth surface 36So. The fourth inner tooth surface 36Si faces the bicycle center plane BCP of the bicycle 1 in the axial direction Da. The fourth outer tooth surface 36So is opposite to the fourth inner tooth surface 36Si in the axial direction Da. The fourth sprocket tooth 36 has a symmetrical shape with respect to an axial tooth center plane TCL4 of the fourth sprocket tooth 36. The fourth inner tooth surface 36Si is configured to face the fourth intermediate portion 66 in the axial direction Da in a state where the bicycle chain 20 engages with the fourth sprocket tooth 36. The fourth outer tooth surface 36So is configured to face the third intermediate portion 60 in the axial direction Da in the state where the bicycle chain 20 engages with the fourth sprocket tooth 36. The fourth sprocket tooth 36 has a fourth tooth tip 36t crossing the axial tooth center plane TCL4. In the illustrated embodiment, the fourth tooth tip 36t is flat, but the fourth tooth tip 36t can be sharp.

With the bicycle chain 20, it is possible for the bicycle chain 20 to hold bicycle sprocket teeth 30, 32, 34, and 36 more tightly than a conventional bicycle chain, because of the following reason. The first intermediate portion 42 of the first inner link plate 22 has the axial recess 44 formed on the first inner surface 22Si in the axial direction Da, whereas the second intermediate portion 50 of the second inner link plate 24 is free from an axial recess formed on the second inner surface 24Si. In other words, the longitudinal outer link space center line 27CL is offset from the longitudinal inner link space center line 23CL in the axial direction Da.

Modification of the Embodiment

In the above embodiment, the first link pins 68 and the second link pins 70 are separate members from the first outer link plates 26 and the second outer link plates 28. However, at least one of the first link pins 68 and the second link pins 70 can be integrated with one of the first outer link plate 26 and the second outer link plate 28. Such integrated members are one piece unitary members. Such integrated members can be manufactured with die casting or cutting metal.

Figure 16:
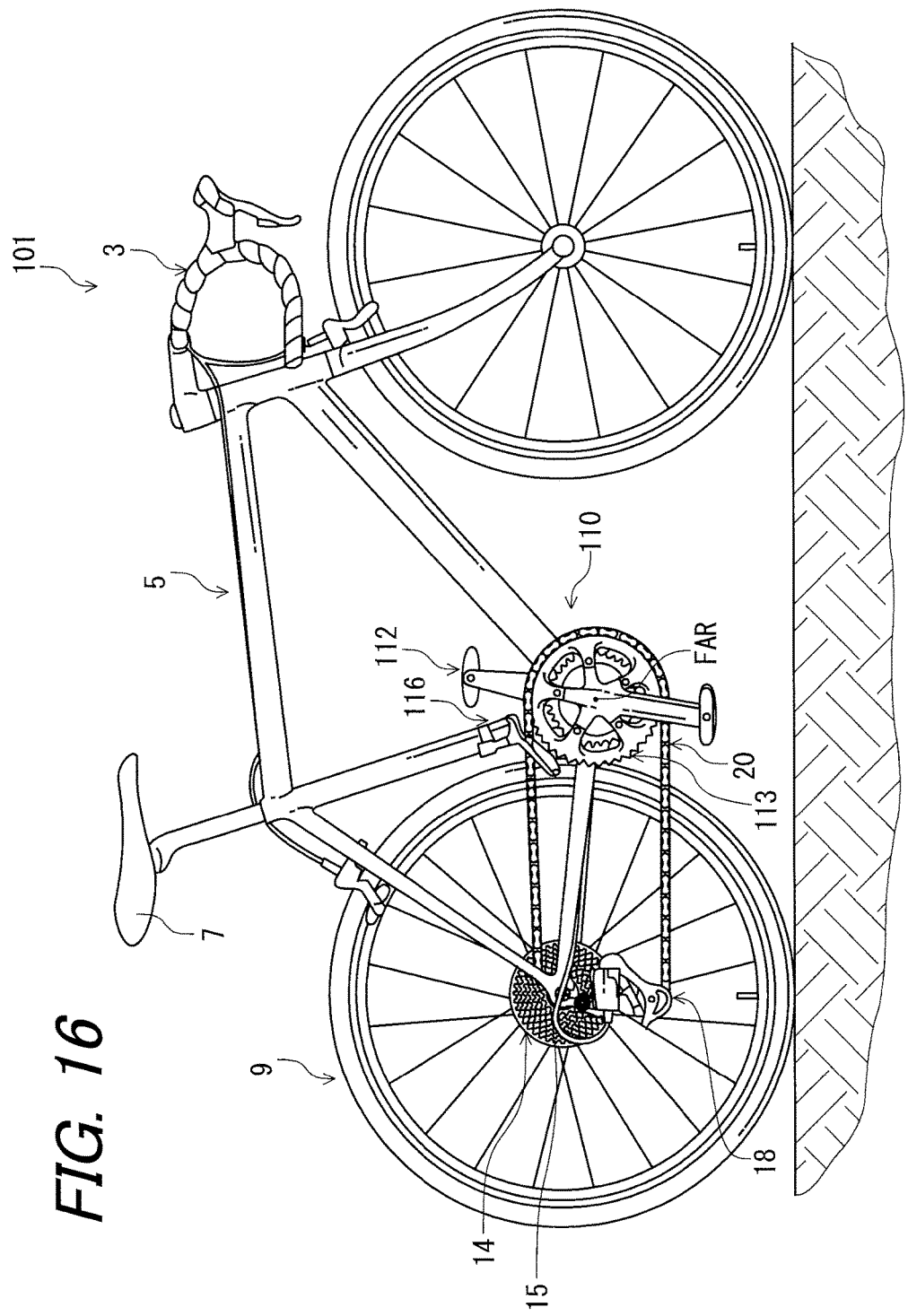
FIG. 16 is a side elevational view of a bicycle having a drive train that uses a bicycle chain in accordance with modification of an embodiment of the present invention.

In the above illustrated embodiment, the bicycle 1 has the singular front sprocket 13. However, the bicycle 1 can have multiple front sprockets in the front crank set 12. In following description, such bicycle is referred to as a bicycle 101. As seen in FIG. 16, the bicycle 101 includes a drive train 110. The drive train 110 further includes a front derailleur 116 in addition to components of the drive train 10 in the above embodiment and includes a front crank set 112 in place of the front crank set 12 in the above embodiment. The front crank set 112 includes a bicycle front sprocket assembly 113 to engage with the bicycle chain 20. The bicycle front sprocket assembly 113 includes at least two front sprockets. The front derailleur 116 is configured and arranged to change the bicycle front sprockets of the bicycle front sprocket assembly 113 by shifting the bicycle chain 20 in a transverse direction of the bicycle 101. In the bicycle 101, the at least one bicycle rear sprocket 15 can be a singular rear sprocket and the bicycle rear derailleur 18 can be omitted.

In this modification, the bicycle chain 20 of the bicycle 101 can be arranged in a different orientation from that of the bicycle chain 20 of the bicycle 1 in order to facilitate a shifting operation of the bicycle front sprockets of the bicycle front sprocket assembly 113 by the front derailleur 116. More specifically, as seen in FIG. 3, the first inner link plate 22 is disposed closer to a bicycle center plane BCP2 of the bicycle 101 than the second inner link plate 24 in a state where the bicycle chain 20 is mounted to the bicycle 101. Contrary to the arrangement of the bicycle rear sprockets, as the bicycle front sprockets of the bicycle front sprocket assembly 113 have larger size, they are arranged farther from the bicycle center plane BCP2 of the bicycle 101. Accordingly, it is less possible that the axial recess 44 interferes with the shifting operation of the bicycle front sprockets of the bicycle front sprocket assembly 113, and the first chamfer 52 is configured to facilitate the shifting operation of the bicycle front sprockets of the bicycle front sprocket assembly 113.

The term "comprising" and its derivatives, as used herein, are intended to be open ended terms that specify the presence of the stated features, elements, components, groups, integers, and/or steps, but do not exclude the presence of other unstated features, elements, components, groups, integers and/or steps. This concept also applies to words of similar meaning, for example, the terms "have", "include" and their derivatives.

The terms "member", "section", "portion", "part" or "element" when used in the singular can have the dual meaning of a single part or a plurality of parts.

The ordinal numbers such as "first" and "second" recited in the present application are merely identifiers, but do not have any other meanings, for example, a particular order and the like. Moreover, for example, the term "first element" itself does not imply an existence of "second element", and the term "second element" itself does not imply an existence of "first element."

The term "pair of", as used herein, can encompass the configuration in which the pair of elements have different shapes or structures from each other in addition to the configuration in which the pair of elements have the same shapes or structures as each other.

Finally, terms of degree such as "substantially", "about" and "approximately" as used herein mean a reasonable amount of deviation of the modified term such that the end result is not significantly changed.

Obviously, numerous modifications and variations of the present invention are possible in light of the above teachings. It is therefore to be understood that within the scope of the appended claims, the invention may be practiced otherwise than as specifically described herein.

What is claimed is:

1. A bicycle chain comprising:
    a first inner link plate comprising:
        a first end portion including a first opening having a first center axis;
        a second end portion including a second opening having a second center axis; and
        a first intermediate portion interconnecting the first end portion and the second end portion; and
    a second inner link plate spaced apart from the first inner link plate in an axial direction parallel to one of the first center axis and the second center axis in an assembled state where the bicycle chain is assembled, the second inner link plate comprising:
        a third end portion including a third opening having a third center axis;
        a fourth end portion including a fourth opening having a fourth center axis; and
        a second intermediate portion interconnecting the third end portion and the fourth end portion,
    the first inner link plate including a first outer surface and a first inner surface opposite to the first outer surface in the axial direction, the second inner link plate including a second outer surface and a second inner surface opposite to the second outer surface in the axial direction, the first inner surface and the second inner surface being configured to face each other in the assembled state,
    the first intermediate portion of the first inner link plate having an axial recess formed on the first inner surface in the axial direction,
    the second intermediate portion of the second inner link plate being free from an axial recess formed on the second inner surface of the second intermediate portion in the axial direction.

2. The bicycle chain according to claim 1, wherein the second intermediate portion has an edge and includes a chamfer formed on the edge.

3. The bicycle chain according to claim 2, wherein the chamfer is configured to facilitate a shifting operation.

4. The bicycle chain according to claim 1, wherein the first inner link plate has a longitudinal center axis as viewed from the axial direction, and the axial recess at least partly overlaps with the longitudinal center axis as viewed from the axial direction.

5. The bicycle chain according to claim 4, wherein the first intermediate portion has a first edge and a second edge opposite to the first edge in a transverse direction perpendicular to the longitudinal center axis, and the axial recess extends from the first edge to the second edge.

6. The bicycle chain according to claim 1, wherein the axial recess is formed by bending the first inner link plate at the first intermediate portion.

7. The bicycle chain according to claim 1, wherein the first inner link plate is disposed farther from a bicycle center plane of a bicycle than the second inner link plate in a state where the bicycle chain is mounted to the bicycle.

8. The bicycle chain according to claim 1, wherein the first inner link plate is disposed closer to a bicycle center plane of a bicycle than the second inner link plate in a state where the bicycle chain is mounted to the bicycle.

9. The bicycle chain according to claim 1, wherein the first inner link plate and the second inner link plate form an inner link space therebetween, and the inner link space is configured to receive a sprocket tooth of a bicycle sprocket and has a first maximum transverse width ranging from 2.1 mm to 3.6 mm.

10. The bicycle chain according to claim 1, further comprising:
a first outer link plate and a second outer link plate opposite to the first outer link plate in the axial direction, the first outer link plate and the second outer link plate forming an outer link space defined therebetween, the outer link space being configured to receive a sprocket tooth of a bicycle sprocket and having a second maximum transverse width equal to or less than 4.1 mm.

11. The bicycle chain according to claim 1, wherein
the first inner link plate and the second inner link plate form an inner link space therebetween, the inner link space having a first maximum transverse width and being configured to receive a sprocket tooth of a bicycle sprocket,
the bicycle chain further comprises a first outer link plate and a second outer link plate opposite to the first outer link plate in the axial direction, the first outer link plate and the second outer link plate forming an outer link space therebetween, the outer link space having a second maximum transverse width and being configured to receive a sprocket tooth of the bicycle sprocket, and
the first maximum transverse width divided by the second maximum transverse width is equal to or larger than 0.6.

12. A drive train comprising:
the bicycle chain according to claim 1; and
at least one bicycle rear sprocket including a first sprocket tooth to be received in an inner link space defined between the first inner link plate and the second inner link plate.

13. The drive train according to claim 12, wherein
the bicycle chain further comprises a first outer link plate and a second outer link plate opposite to the first outer link plate in the axial direction,
the at least one bicycle rear sprocket further includes a second sprocket tooth to be received in an outer link space defined between the first outer link plate and the second outer link plate,
the first sprocket tooth has a first chain engaging width, and
the second sprocket tooth has a second chain engaging width that is larger than the first chain engaging width in the axial direction.

14. A drive train comprising:
the bicycle chain according to claim 1; and
a bicycle front sprocket including a third sprocket tooth to be received in an inner link space defined between the first inner link plate and the second inner link plate.

15. The drive train according to claim 14, wherein
the bicycle chain further comprises a first outer link plate and a second outer link plate opposite to the first outer link plate in the axial direction,
the bicycle front sprocket further includes a fourth sprocket tooth to be received in an outer link space defined between the first outer link plate and the second outer link plate,
the third sprocket tooth has a third chain engaging width, and
the fourth sprocket tooth has a fourth chain engaging width that is larger than the third chain engaging width in the axial direction.

16. The bicycle drive train according to claim 14, wherein
the bicycle front sprocket is a singular front sprocket.

17. A bicycle chain comprising:
a first inner link plate comprising:
a first end portion including a first opening having a first center axis;
a second end portion including a second opening having a second center axis; and
a first intermediate portion interconnecting the first end portion and the second end portion;
a second inner link plate spaced apart from the first inner link plate in an axial direction parallel to one of the first center axis and the second center axis to provide an inner link space between the first inner link plate and the second inner link plate in an assembled state where the bicycle chain is assembled, the inner link space being configured to receive a sprocket tooth of a bicycle sprocket and having a longitudinal inner link space center line, the second inner link plate comprising:
a third end portion including a third opening having a third center axis;
a fourth end portion including a fourth opening having a fourth center axis; and
a second intermediate portion interconnecting the third end portion and the fourth end portion;
a first outer link plate comprising:
a fifth end portion including a fifth opening having a fifth center axis;
a sixth end portion including a sixth opening having a sixth center axis; and
a third intermediate portion interconnecting the fifth end portion and the sixth end portion; and
a second outer link plate spaced apart from the first outer link plate in the axial direction to form an outer link space between the first outer link plate and the second outer link plate in the assembled state, the outer link space being configured to receive a sprocket tooth of the bicycle sprocket, the first intermediate portion of the first inner link plate having an axial recess formed on an inner surface in the axial direction such that the outer link space has a longitudinal outer link space center line that is offset from the longitudinal inner link space center line in the axial direction.

* * * * *